United States Patent
Nonaka et al.

(10) Patent No.: US 9,340,356 B2
(45) Date of Patent: May 17, 2016

(54) CABLE PROCESSING APPARATUS AND RECORDING MEDIUM CHANGER

(71) Applicant: Sony Corporation, Tokyo (JP)

(72) Inventors: Wataru Nonaka, Tokyo (JP); Hideaki Noguchi, Kanagawa (JP); Shunji Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 14/229,129

(22) Filed: Mar. 28, 2014

(65) Prior Publication Data

US 2014/0301812 A1  Oct. 9, 2014

(30) Foreign Application Priority Data

Apr. 5, 2013  (JP) ................................ 2013-079868

(51) Int. Cl.
*G11B 15/675* (2006.01)
*B65G 1/137* (2006.01)
*B66D 1/74* (2006.01)
*G11B 15/68* (2006.01)
*G11B 17/22* (2006.01)
*G11B 33/12* (2006.01)

(52) U.S. Cl.
CPC .............. *B65G 1/137* (2013.01); *B66D 1/7415* (2013.01); *G11B 15/6805* (2013.01); *G11B 15/6835* (2013.01); *G11B 17/225* (2013.01); *G11B 33/122* (2013.01)

(58) Field of Classification Search
CPC ............ G11B 14/6805; G11B 15/681; G11B 15/6815; G11B 15/6835; G11B 15/6885; G11B 17/10; G11B 17/12; G11B 17/22; G11B 17/225

USPC ................. 360/92.1, 98.04, 98.06; 369/30.4, 369/30.43, 30.45

See application file for complete search history.

(56) References Cited

U.S. PATENT DOCUMENTS

| | | | | |
|---|---|---|---|---|
| 4,310,865 A | * | 1/1982 | Kohl et al. | .................... 360/267 |
| 5,434,832 A | * | 7/1995 | Beal et al. | ..................... 360/92.1 |
| 2008/0229862 A1 | * | 9/2008 | Nakamoto | ................. 74/490.04 |
| 2013/0090194 A1 | * | 4/2013 | Ferlay | ..................... B25J 9/104 474/64 |
| 2014/0158821 A1 | * | 6/2014 | Keennon | ................ B64C 33/02 244/72 |
| 2014/0158839 A1 | * | 6/2014 | Doyle | .................... A61B 19/28 248/118 |
| 2015/0071744 A1 | * | 3/2015 | Miyaguchi et al. | ........... 414/277 |

* cited by examiner

*Primary Examiner* — Jefferson Evans
(74) *Attorney, Agent, or Firm* — Sheridan Ross P.C.

(57) ABSTRACT

A cable processing apparatus includes a first pulley, a second pulley, and a cable. The first pulley is configured to rotate about a rotational axis. The second pulley is configured to rotate about the rotational axis together with the first pulley. The cable includes a fixation region to be fixed to the first pulley and the second pulley. The first pulley is configured to rotate about the rotational axis, to thereby perform one of winding of the cable from the fixation region to one end portion and unwinding of the wound cable. The cable includes a predetermined-length portion from the fixation region to the other end portion, which is wound around the second pulley. The second pulley is configured to rotate about the rotational axis together with the first pulley, to thereby perform one of rewinding and tightening of the wound predetermined-length portion of the cable.

8 Claims, 17 Drawing Sheets

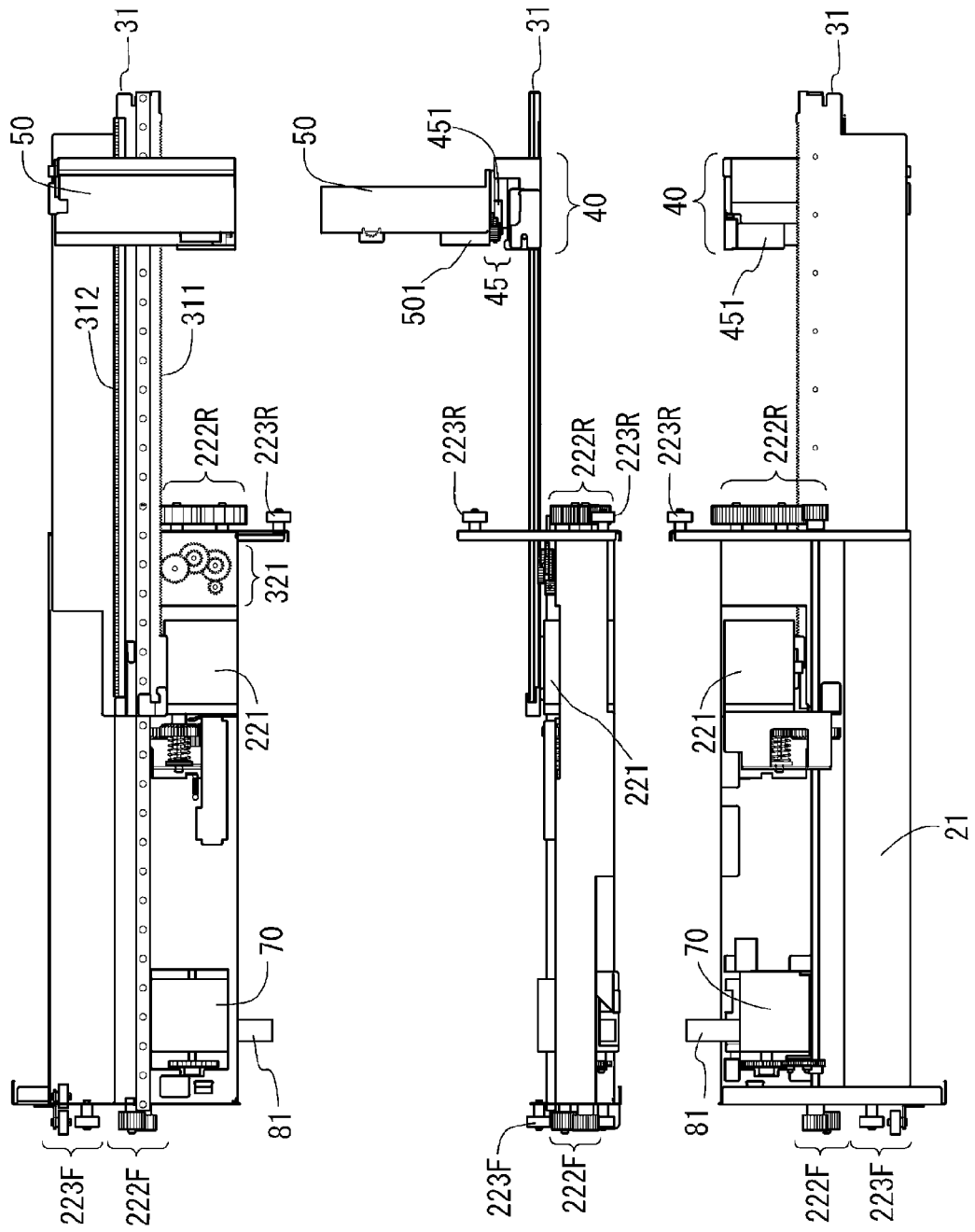

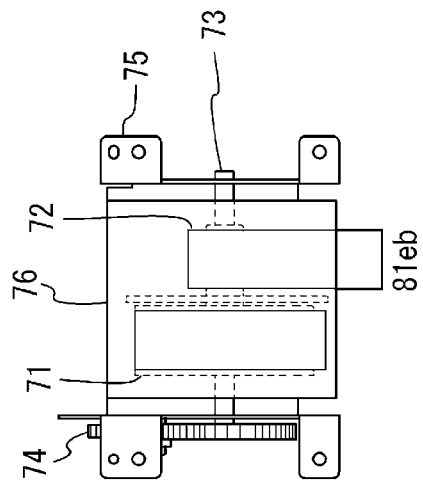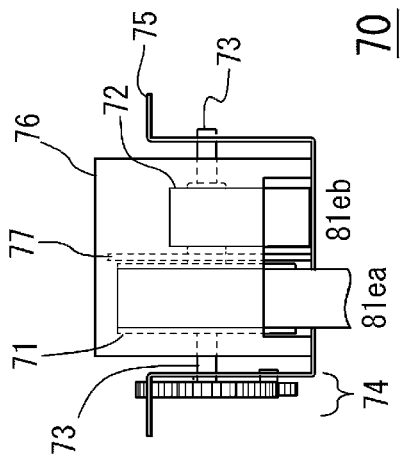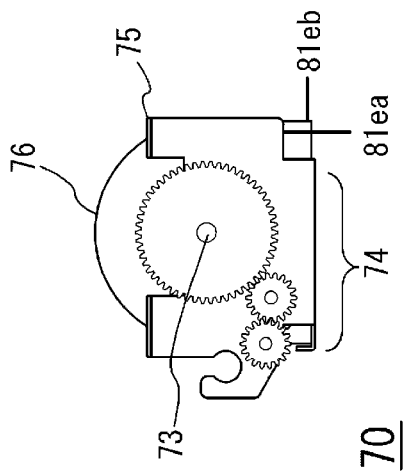

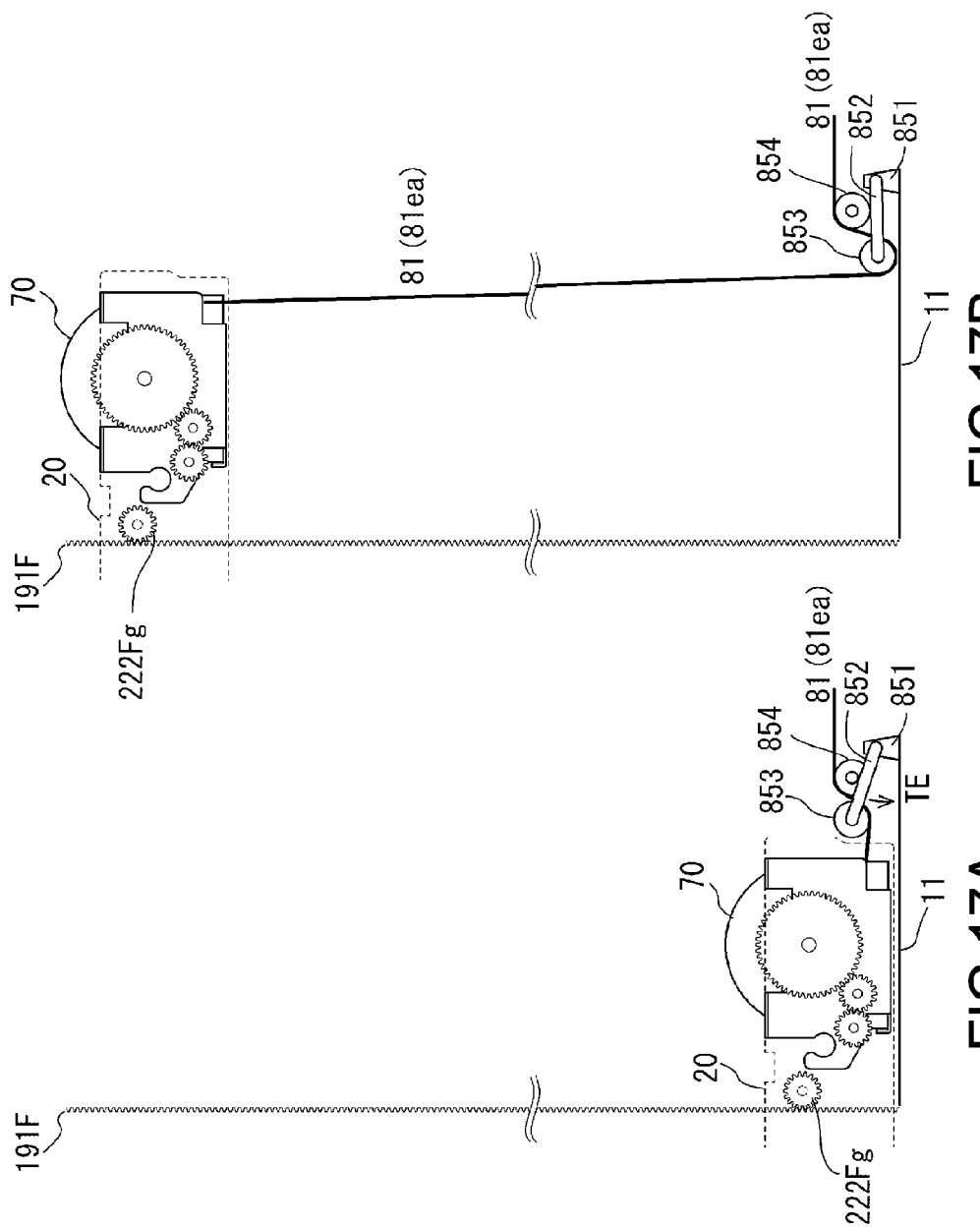

CABLE PROCESSING APPARATUS AND RECORDING MEDIUM CHANGER

CROSS REFERENCE TO RELATED APPLICATIONS

This application claims the benefit of Japanese Priority Patent Application JP 2013-079868 filed Apr. 5, 2013, the entire contents of which are incorporated herein by reference.

BACKGROUND

The present disclosure relates to a cable processing apparatus and a recording medium changer, by which a highly reliable recording medium carrying operation can be easily performed at low costs with a compact configuration.

In related art, a recording medium changer has been used for storing data of content (e.g., image, music, text, or information of combination of them), various programs, and the like. In the recording medium changer, recording media or cartridges housing the recording media (hereinafter, simply referred to as "recording media") are housed in a plurality of slots (cells) provided in a casing. In the recording medium changer, a desired recording medium is conveyed by a conveying block to a drive block and installed into the drive block. Further, in such a recording medium changer, in order to perform a desired conveying operation in the conveying block, a cable for performing power supply and communication with a control block provided in a casing is connected.

In the case where the control block is fixedly attached to the casing, the cable needs to have a length such that the conveying block is at a farthest position from the control block. Therefore, when the control block and the conveying block are close to each other, the cable is largely redundant. Therefore, for example, Japanese Patent Application Laid-open No. 2003-30913 (hereinafter, referred to as Patent Document 1) discloses that a folding cable is used. In Patent Document 1, the cable is extended as the conveying block moves away from the control block and the cable is folded as the conveying block comes closer to the control block.

SUMMARY

By the way, in the case where the folding cable is used as in Patent Document 1, if a longer cable is used as the cable, the fluctuation of the position of the cable may be larger when the folded cable is extended or when the extended cable is folded. Therefore, it is necessary to provide a guide mechanism that guides the cable position in order to prevent the cable from being caught in other parts within a casing, for example.

Further, in the case where a slip ring is used, the apparatus becomes expensive. In addition, in the case where the slip ring is used, it is necessary to carry out regular inspections and replacement in order to prevent a loose connection at a contact point due to abrasion or the like.

In view of the above-mentioned circumstances, it is desirable to provide a cable processing apparatus and a recording medium changer, by which highly reliable cable processing can be easily performed at low costs with a compact configuration.

According to a first embodiment of the present disclosure, there is provided a cable processing apparatus including a first pulley, a second pulley, and a cable. The first pulley is configured to rotate about a rotational axis. The second pulley is configured to rotate about the rotational axis together with the first pulley. The cable includes a fixation region to be fixed to the first pulley and the second pulley. The first pulley is configured to rotate about the rotational axis, to thereby perform one of winding of the cable from the fixation region to one end portion and unwinding of the wound cable. The cable includes a predetermined-length portion from the fixation region to the other end portion, which is wound around the second pulley. The second pulley is configured to rotate about the rotational axis together with the first pulley, to thereby perform one of rewinding and tightening of the wound predetermined-length portion of the cable.

In the embodiment of the present disclosure, the first pulley and the second pulley are integrally rotated about the rotational axis. The fixation region of the cable is fixed to the first pulley and the second pulley. The fixation region is, for example, a region formed by bending the cable with a longitudinal direction of the cable being a direction orthogonal to the rotational axis to extend in a direction of the rotational axis. The first pulley and the second pulley are provided with a cable insertion portion extending in the direction of the rotational axis, and the fixation region is inserted into the cable insertion portion such that the cable is fixed to the first pulley and the second pulley.

The first pulley has, for example, a diameter larger than a diameter of the second pulley such that one of winding and unwinding of a desired cable length is performed in a rotation range in which one of rewinding and tightening is performed by the second pulley.

The first pulley rotates about the rotational axis, to thereby perform one of winding of the cable from the fixation region to one end portion and unwinding of the wound cable. Further, the cable includes a predetermined-length portion from the fixation region to the other end portion, which is wound around the second pulley. The second pulley rotates about the rotational axis together with the first pulley, to thereby perform one of rewinding and tightening of the wound predetermined-length portion of the cable. For example, the cable is wound around the first pulley and the second pulley in the same direction, and the second pulley performs tightening of the cable depending on rotation of the cable in a winding direction in the first pulley, and performs rewinding of the cable depending on rotation of the cable in an unwinding direction in the first pulley. Alternatively, the cable is wound around the first pulley and the second pulley in opposite directions, and the second pulley performs rewinding of the cable depending on rotation of the cable in a winding direction in the first pulley, and performs tightening depending on rotation of the cable in an unwinding direction in the first pulley.

According to a second embodiment of the present disclosure, there is provided a recording medium changer including a plurality of slots, a drive, a conveying mechanism, a cable, and a cable processing mechanism. In the plurality of slots, a recording medium is housed. The drive is configured to perform an operation using the recording medium. The conveying mechanism is configured to convey the recording medium between the plurality of slots and the drive. The cable is configured to electrically connect a casing to the conveying mechanism. The cable processing mechanism is configured to process the cable. The cable processing mechanism includes a first pulley configured to rotate about a rotational axis, and a second pulley configured to rotate about the rotational axis together with the first pulley. The cable includes a fixation region at a predetermined position. The fixation region is to be fixed to the first pulley and the second pulley. The first pulley is configured to rotate along with movement of the conveying mechanism in a longitudinal direction of the cable, to thereby perform one of winding of the cable from the fixation region to one end portion, that is, a side of one of the conveying mechanism and the casing and unwinding of the wound cable. The cable includes a predetermined-length portion from the fixation region to the other end portion, that is, a side of the other of the conveying mechanism and the casing, which is wound around the second pulley. The second pulley is configured to rotate about the rotational axis together with the first pulley, to thereby perform one of rewinding and tightening of the wound predetermined-length portion of the cable.

According to the embodiments of the present disclosure, used are the first pulley that rotates about the rotational axis, the second pulley that rotates about the rotational axis together with the first pulley, and the cable including the fixation region to be fixed to the first pulley and the second pulley. The first pulley rotates along with movement of the conveying mechanism in a longitudinal direction of the cable, to thereby perform one of winding of the cable from the fixation region in a direction of one end portion. The cable includes a predetermined-length portion from the fixation region in a direction of the other end portion, which is wound around the second pulley. The second pulley rotates about the rotational axis together with the first pulley, to thereby perform one of rewinding and tightening of the wound predetermined-length portion of the cable. Therefore, even when winding or unwinding of the cable is performed by the first pulley, the cable length pulled out from the second pulley can be kept constant, for example. Highly reliable cable processing can be easily performed at low costs with a simple configuration. Note that the effects set forth herein are merely examples and not limited, and additional effects may be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 11A-C are views illustrating the configuration of the conveying block (when a rail portion is in an extension state);

FIGS. 14A-C are views illustrating a configuration of a cable processing block;

FIGS. 17A-B are views illustrating a configuration in which a fluctuation absorbing mechanism is provided.

DETAILED DESCRIPTION OF EMBODIMENTS

Hereinafter, an embodiment of the present disclosure will be described with reference to the drawings.

Hereinafter, an embodiment of the present disclosure will be described with reference to the drawings. Note that descriptions will be made in the following order.
1. Configuration of Recording Medium Changer
2. Configuration of Conveying Block
3. Operation of Conveying Block
4. Cable Processing Block
4-1. Configuration of Cable Processing Block
4-2. Attachment of Cable
4-3. Operation of Cable Processing Block
4-4. Case Where Fluctuation Absorbing Mechanism is Provided <1. Configuration of Recording Medium Changer>

Figure 1:
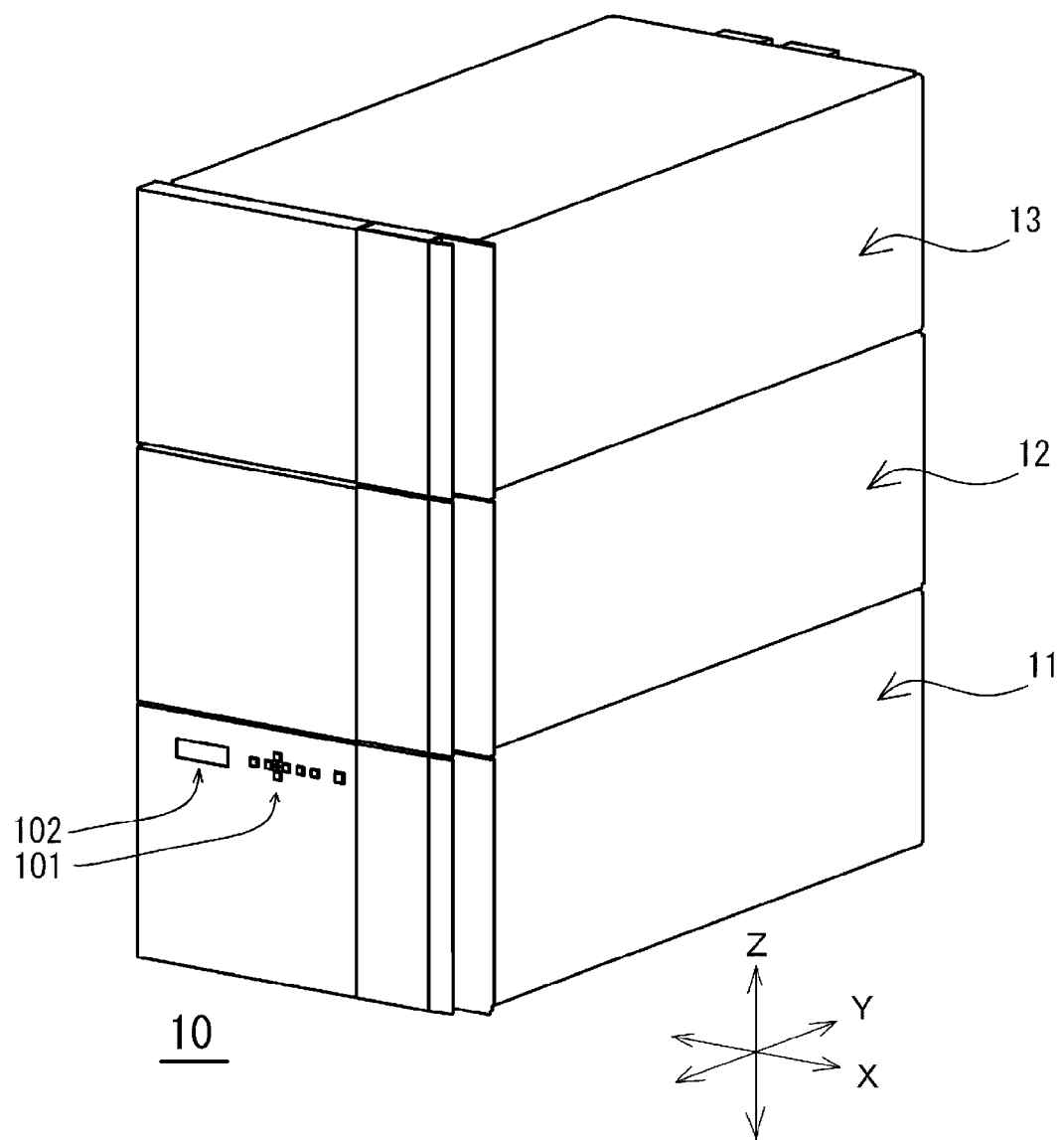
FIG. 1 is a perspective view showing an outer appearance of a recording medium changer according to an embodiment.

FIG. 1 shows an outer appearance of a recording medium changer according to an embodiment of the present disclosure. A recording medium changer 10 includes slots (cells), a drive block, a conveying block, a control block, a power-supply block, and the like. Further, in a front surface of the recording medium changer 10, there are provided an operation portion 101 and a display portion 102. The operation portion 101 includes switches or the like for performing setting and switching operations of the recording medium changer or the like. The display portion 102 displays an operation state, various types of information, and the like of the recording medium changer. Note that the description will be made referring a lateral direction of the recording medium changer 10 to as an X-direction, a depth direction to as a Y-direction, and a height direction to as a Z-direction.

The recording medium changer 10 is configured such that the slots and the drive block can be extended. For example, the recording medium changer 10 can be additionally provided with a slot by adding a slot extension unit 12 to a basic unit 11. Further, the recording medium changer 10 can be additionally provided with the drive block or with the slot and the drive block by adding a drive extension unit 13 to the basic unit 11.

Figure 2:
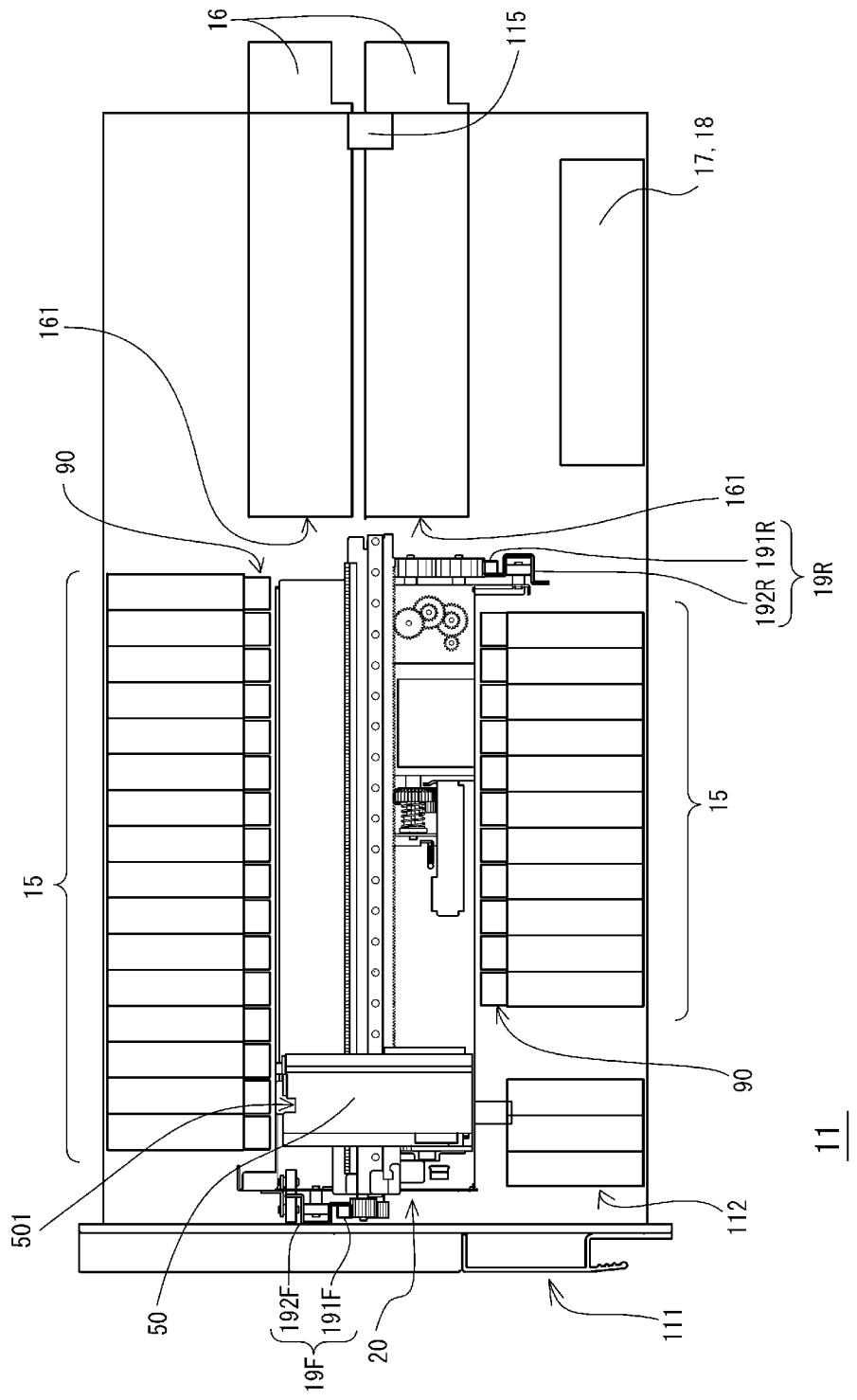
FIG. 2 is a plan view illustrating a configuration of a basic unit.

FIG. 2 is a plan view illustrating a configuration of the basic unit. The basic unit 11 includes a door 111, a recording medium relay portion 112, slots 15, drive blocks 16, a control block 17, a power-supply block 18, a conveying block 20, and the like.

The door 111 is opened and closed when a recording medium 90 is housed or discharged in/from the recording medium changer 10, such that the recording medium relay portion 112 can be pulled out.

The recording medium relay portion 112 relays the recording medium between the inside and outside of the recording medium changer 10. Specifically, when the recording medium is housed in the recording medium changer 10, the recording medium relay portion 112 holds the recording medium and moves the recording medium to the inside of the recording medium changer 10. On the other hand, when the recording medium is discharged from the recording medium changer 10, the recording medium held by the recording medium relay portion 112 is moved to the outside of the recording medium changer 10.

The slots 15 are configured to be arranged on both side surfaces of the casing, for example. Recording media are installed in the respective slots. Each slot 15 is provided such that an inserting-removing direction of the recording medium 90 is in a vertical direction (X-direction) with respect to a side surface of the casing. Further, the conveying block 20 is provided to be movable in upper and lower directions (Z-direction) as will be described later between the slots 15 arranged on one side surface and the slots 15 arranged on the other side surface.

The drive blocks 16 are provided at positions on a back side with respect to the slots 15 between the slots 15 arranged on the one side surface and the slots 15 arranged on the other side surface. Further, the drive blocks 16 are provided such that recording medium insertion ports 161 are oriented to the front side (side of the conveying block 20).

The conveying block 20 includes a recording medium delivery block 50. The recording medium delivery block 50 delivers the recording media 90 between the slots 15 and the drive blocks 16. Specifically, the recording medium delivery block 50 performs processing of taking out the recording medium 90 from the slot 15 and temporarily holding the recording medium 90 and processing of mounting the held recording medium 90 on the drive block 16. Further, the recording medium delivery block 50 performs processing of taking out the recording medium 90 discharged from the drive blocks 16 and temporarily holding the recording medium 90 and processing of installing the held recording medium 90 into the slot 15.

The conveying block 20 moves the recording medium delivery block 50 in front and rear directions (Y-direction) and positions the recording medium delivery block 50 at the position of the desired slot 15 or a position corresponding to the recording medium insertion port 161 of the drive block 16. Further, when the slot extension unit 12 or the drive extension unit 13 is added, the conveying block 20 is movable in the upper and lower directions (Z-direction) such that the recording medium delivery block 50 can be positioned at a height corresponding to the desired slot 15 or drive block 16 of those units. In addition, the recording medium delivery block 50 performs a movement in the slot direction (X-direction) and a rotational movement with the upper and lower directions (Z-direction) being a rotational axis. The recording medium delivery block 50 moves in the slot direction (X-direction), to thereby change a distance from the slot 15, the recording medium 90, or the like. Further, the recording medium delivery block 50 performs a rotational movement, such that a recording medium insertion port 561 of the recording medium delivery block 50 is oriented in a direction of the slot 15 or the recording medium insertion port 161 of the drive block 16. Note that FIG. 2 illustrates a case where, when viewed in a direction of the drive block 16 from the front side of the recording medium changer 10, the recording medium insertion port 561 of the outside recording medium delivery block 50 is on a left-hand side.

The control block 17 controls the operation of the conveying block 20 and performs processing of taking out the desired recording medium 90 from the slot 15 and mounting the desired recording medium 90 on the drive block 16 and processing of returning the recording medium 90 discharged from the drive block 16 to the original slot 15. The power-supply block 18 supplies power to the drive blocks 16, the conveying block 20, and the like of the basic unit 11.

Note that the basic unit 11 is provided with a rail support portion 115 that supports a leading end of a rail portion when the rail portion to be described later is extended.

Figure 3:
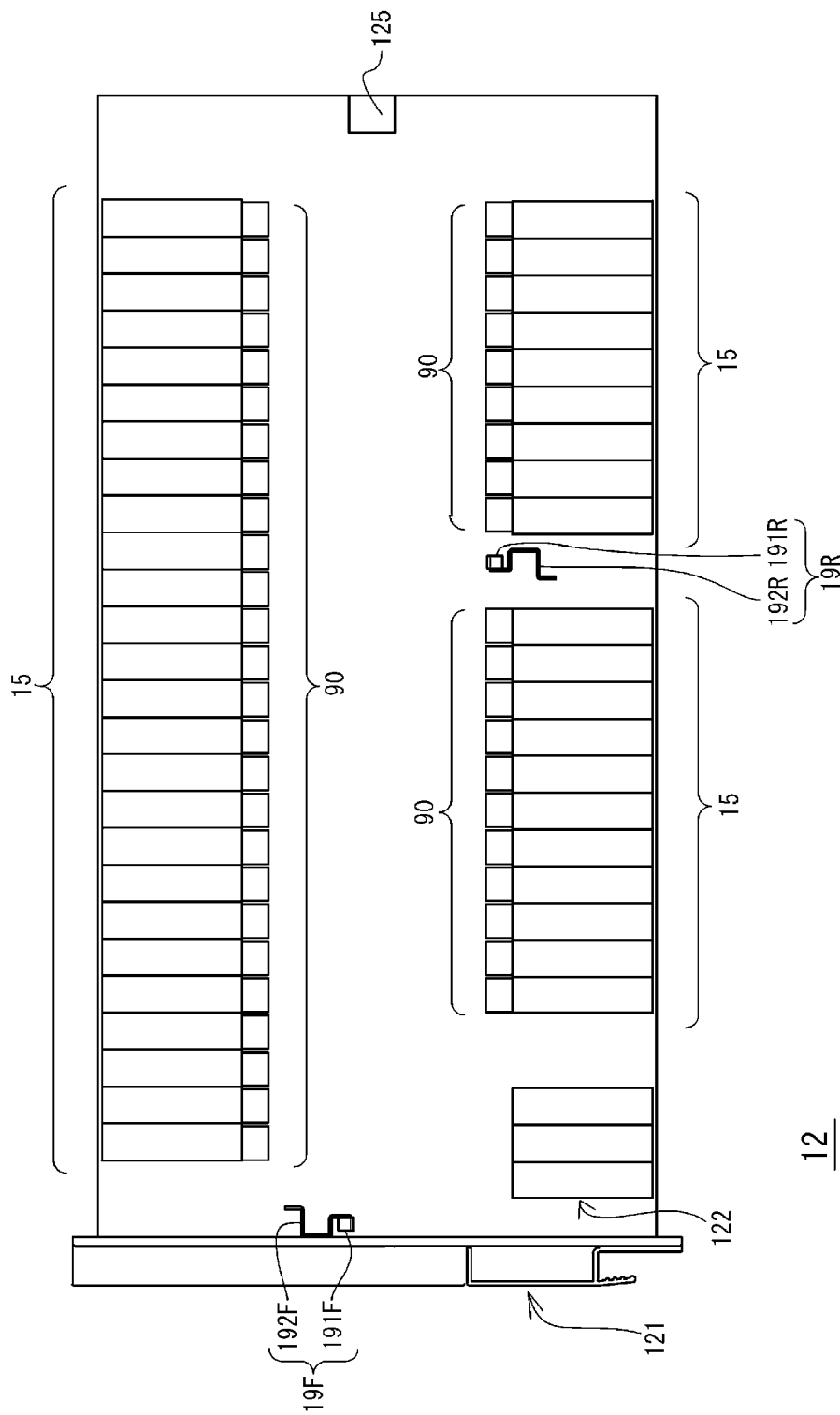
FIG. 3 is a plan view illustrating a configuration of a slot extension unit.

FIG. 3 is a plan view illustrating a configuration of the slot extension unit. The slot extension unit 12 includes a door 121, a recording medium relay portion 122, slots 15, and the like.

The door 121 is opened and closed when a recording medium 90 is housed or discharged in/from the recording medium changer 10, such that the recording medium relay portion 122 can be pulled out.

The recording medium relay portion 122 relays the recording medium between the inside and outside of the recording medium changer 10. Specifically, when the recording medium is housed in the recording medium changer 10, the recording medium relay portion 122 holds the recording medium and moves the recording medium to the inside of the recording medium changer 10. On the other hand, when the recording medium is discharged from the recording medium changer 10, the recording medium held by the recording medium relay portion 122 is moved to the outside of the recording medium changer 10.

The slots 15 are, for example, configured to be arranged in a grid form on both side surfaces of a casing. The recording media are installed into the slots. Each slot 15 is provided such that an inserting-removing direction of the recording medium 90 is the vertical direction (X-direction) with respect to side surfaces of the casing. Further, between the slots 15 arranged on the one side surface and the slots 15 arranged on the other side surface, there is provided a space that enables the conveying block 20 to be movable in the upper and lower directions (Z-direction) when the slot extension unit 12 is added to the basic unit 11.

Note that the slot extension unit 12 is provided with a rail support portion 125 that supports a leading end of a rail portion when the rail portion to be described later is extended.

Figure 4:
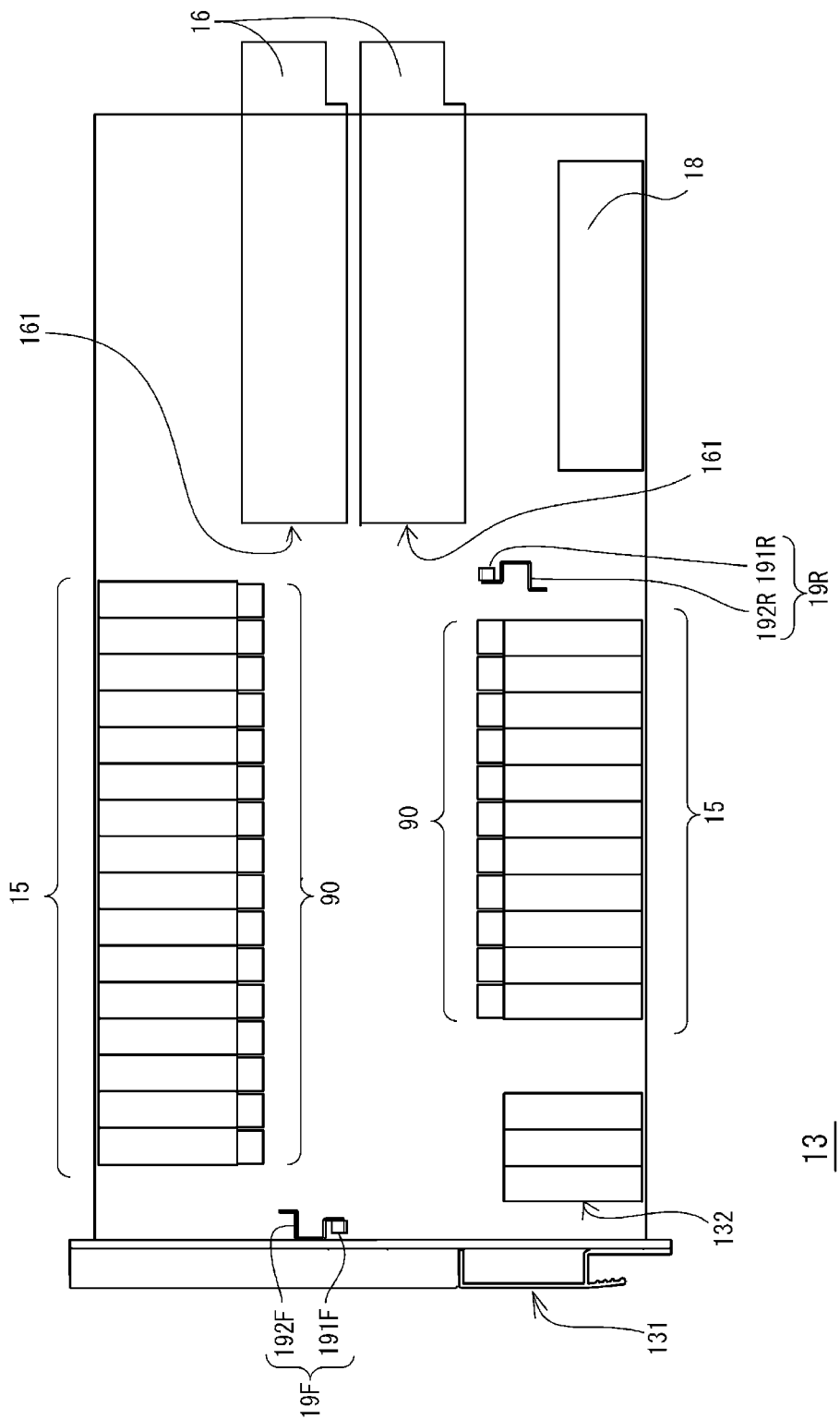
FIG. 4 is a plan view illustrating a configuration of a drive extension unit.

FIG. 4 is a plan view illustrating a configuration of the drive extension unit. The drive extension unit 13 includes a door 131, a recording medium relay portion 132, slots 15, drive blocks 16, and a power-supply block 18.

The door 131 is opened and closed when a recording medium 90 is housed or discharged in/from the recording medium changer 10, such that the recording medium relay portion 132 can be pulled out.

The recording medium relay portion 132 relays the recording medium between the inside and outside of the recording medium changer 10. Specifically, when the recording medium is housed in the recording medium changer 10, the recording medium relay portion 132 holds the recording medium and moves the recording medium to the inside of the recording medium changer 10. On the other hand, when the recording medium is discharged from the recording medium changer 10, the recording medium held by the recording medium relay portion 132 is moved to the outside of the recording medium changer 10.

The slots 15 are, for example, configured to be arranged in a grid form on both side surfaces of a casing. The recording media are installed into the slots. Each slot 15 is provided such that an inserting-removing direction of the recording medium 90 is the vertical direction (X-direction) with respect to side surfaces of the casing. Further, between the slots 15 arranged on one side surface and the slots 15 arranged on the other side surface, there is provided a space that enables the conveying block 20 to be movable in the upper and lower directions (Z-direction) when the drive extension unit 13 is added to the basic unit 11.

The drive blocks 16 are provided at positions on a back side with respect to the slots 15 between the slots 15 arranged on the one side surface and the slots 15 arranged on the other side surface. Further, the drive blocks 16 are provided such that recording medium insertion ports 161 are oriented to the front side (side of the conveying block 20). The power-supply block 18 supplies power to the drive blocks 16 and the like of the drive extension unit 13.

The basic unit 11, the slot extension unit 12, and the drive extension unit 13 are provided with a guide mechanism 19 for making the conveying block 20 movable over the units, for example, a rack 191 and a guide plate 192. The recording medium changer 10 uses the guide mechanism 19 to move the conveying block 20 to a position not only in the basic unit 11 but also in the slot extension unit 12 and the drive extension unit 13. Therefore, the recording medium changer 10 can convey the recording medium 90 installed in one of the slot 15 in any one of the basic unit 11, the slot extension unit 12, and the drive extension unit 13 to one of the drive blocks 16 of the basic unit 11 and the drive extension unit 13. Further, the recording medium changer 10 can return the recording medium discharged from the drive block 16 to the original slot 15.

Further, the recording medium changer 10 conveys the recording media 90 between the slots 15 and the recording medium relay portions 112, 122, and 132. In this manner, installing the recording media into the recording medium changer 10 and discharging the installed recording media can be performed.

Figure 5:
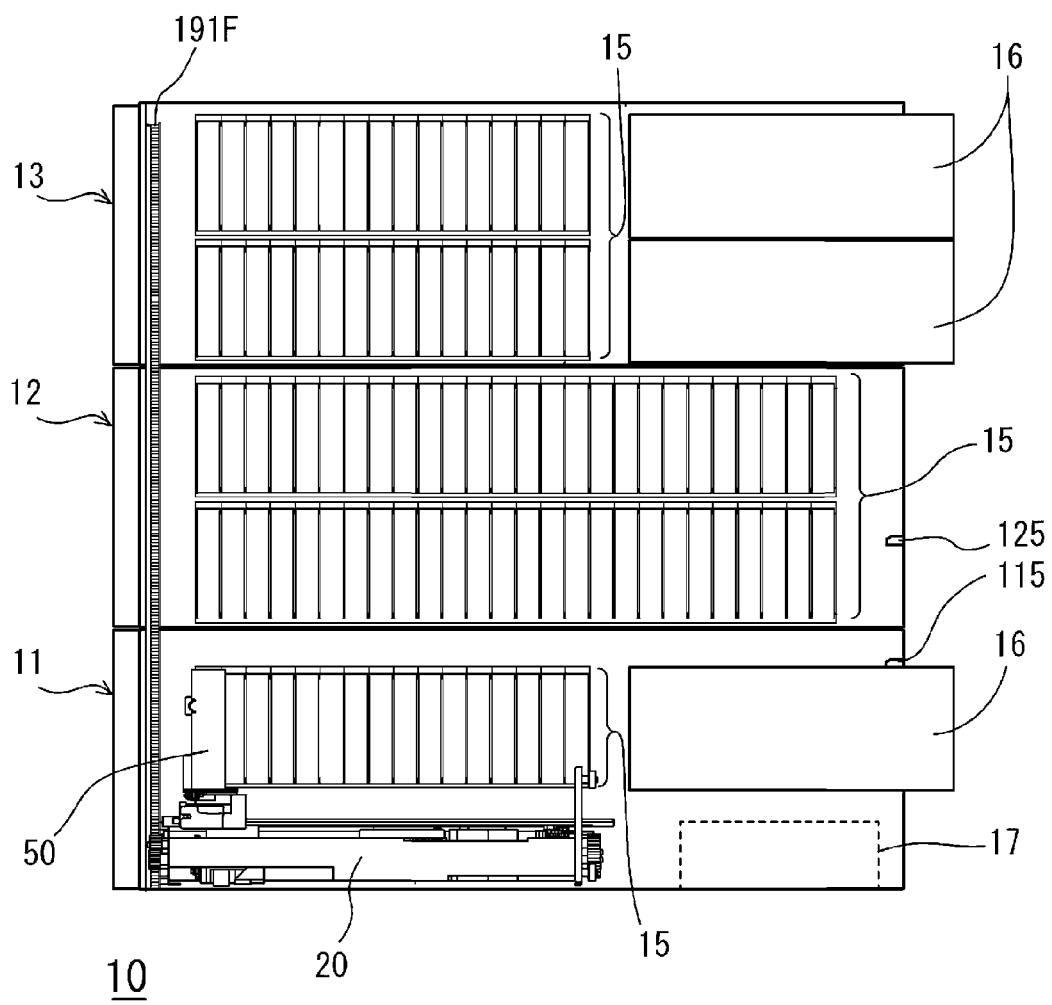
FIG. 5 is an inner side view illustrating a configuration of the recording medium changer when the basic unit, the slot extension unit, and the drive extension unit are used (when a conveying block is positioned at a position of the basic unit)
Figure 6:
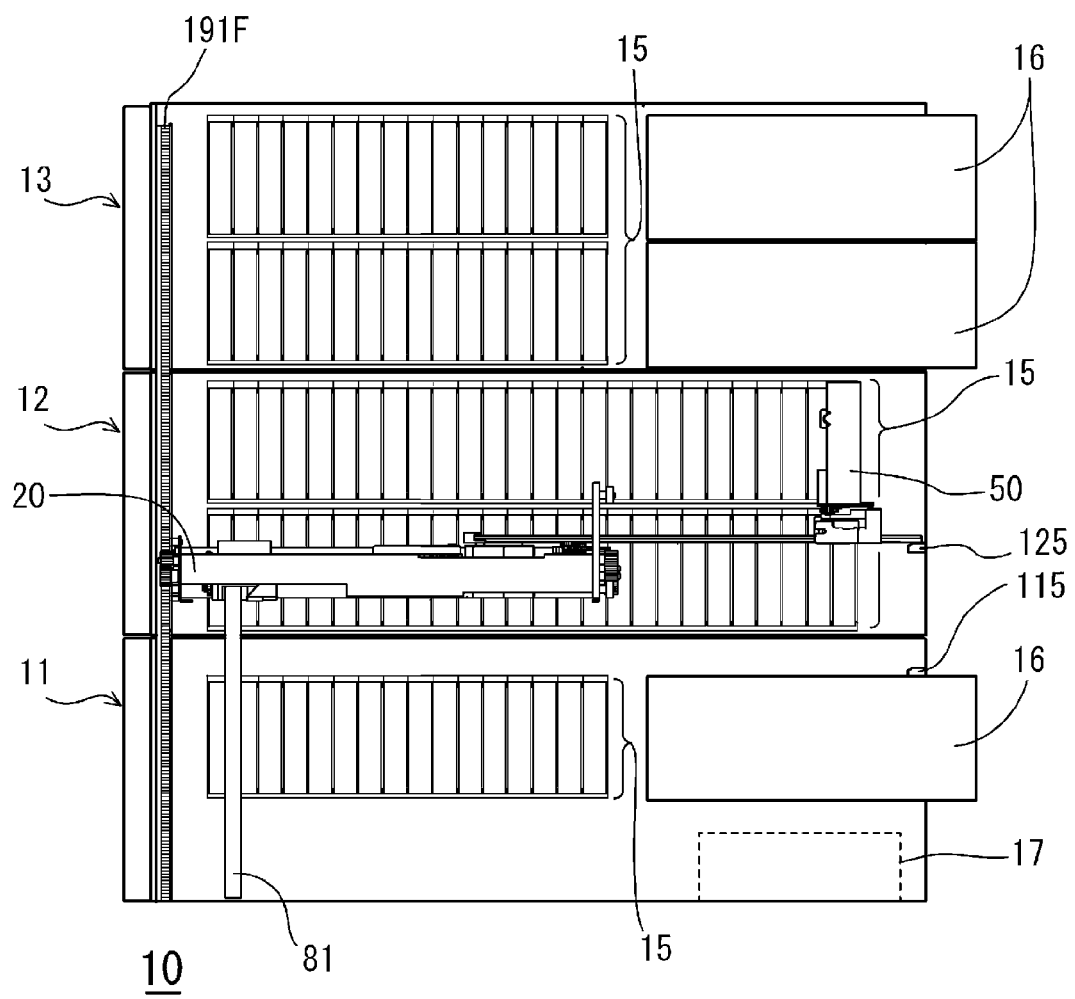
FIG. 6 is an inner side view illustrating a configuration of the recording medium changer when the basic unit, the slot extension unit, and the drive extension unit are used (when a conveying block is positioned at a position of the slot extension unit)
Figure 7:
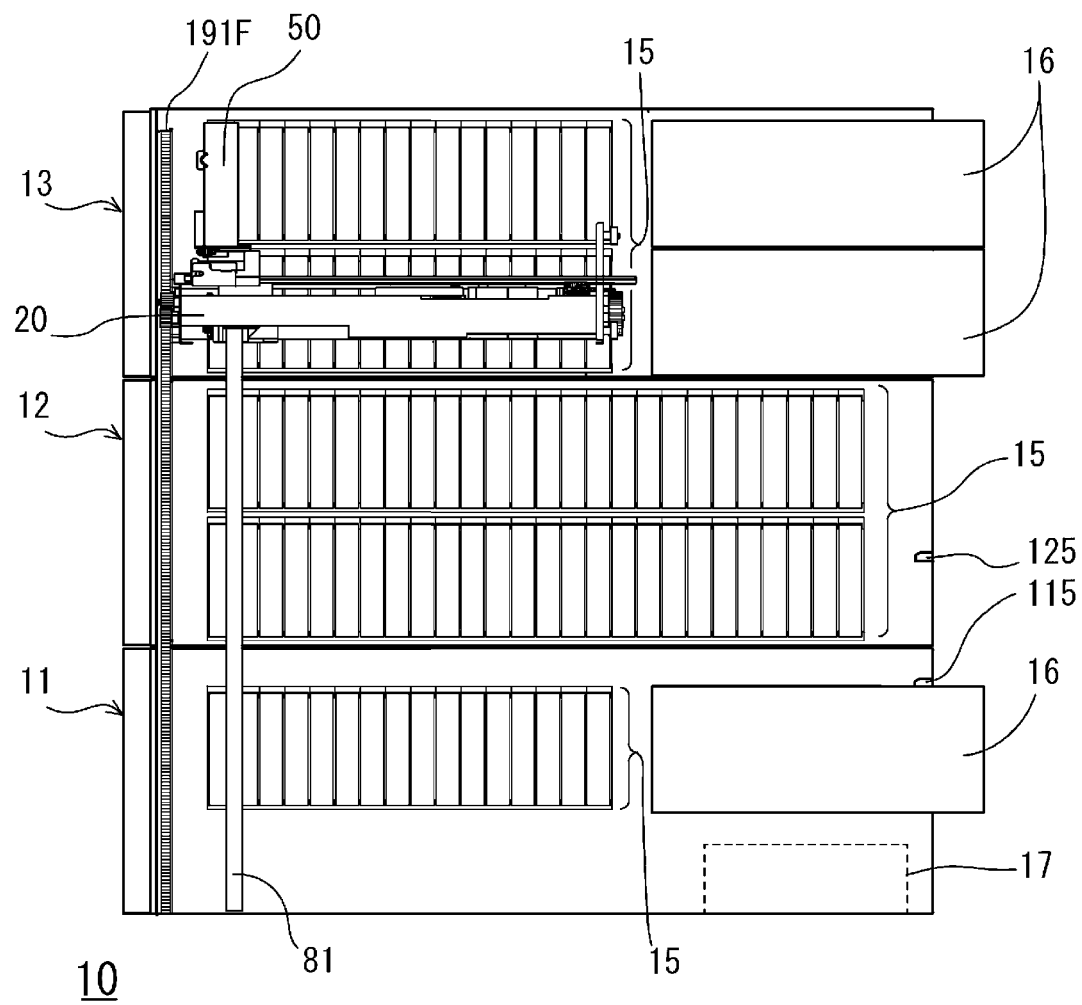
FIG. 7 is an inner side view illustrating a configuration of the recording medium changer when the basic unit, the slot extension unit, and the drive extension unit are used (when a conveying block is positioned at a position of the drive extension unit)

FIGS. 5 to 7 are inner side views each illustrating a configuration of the recording medium changer when the basic unit, the slot extension unit, and the drive extension unit are used. Note that FIG. 5 shows a case where the conveying block is positioned at the position of the basic unit. FIG. 6 shows a case where the conveying block is positioned at the position of the slot extension unit. FIG. 7 shows a case where the conveying block is positioned at a position of the drive extension unit.

The recording medium changer 10 delivers the recording medium 90 between the slot 15 of the basic unit 11 and the recording medium delivery block 50. In this case, as shown in FIG. 5, the recording medium changer 10 moves the conveying block 20 in a direction (Z-direction) such that the recording medium delivery block 50 is at a height of the desired slot 15 by the use of the rack 191. Further, the recording medium changer 10 moves the recording medium delivery block 50 in the depth direction (Y-direction) such that the recording medium delivery block 50 is at a position to be opposed to the desired slot 15.

Further, the recording medium changer 10 delivers the recording medium 90 between the slot 15 of the slot extension unit 12 and the recording medium delivery block 50. In this case, as shown in FIG. 6, the recording medium changer 10 moves the conveying block 20 by the use of the rack 191 in a direction (Z-direction) such that the recording medium delivery block 50 is at a height of the desired slot. Further, the recording medium changer 10 moves the recording medium delivery block 50 in the depth direction (Y-direction) such that the recording medium delivery block 50 is at a position to be opposed to the desired slot 15. Note that, a rail portion 31 can be extended and contracted such that the conveying block 20 can move the recording medium delivery block 50 to the position to be opposed to the desired slot. Here, as shown in FIG. 6, when the rail portion 31 is extended and contracted, the leading end of the rail portion 31 is supported by the rail support portion 125.

Further, the recording medium changer 10 delivers the recording medium 90 between the slot 15 of the drive extension unit 13 and the recording medium delivery block 50. In this case, as shown in FIG. 7, the recording medium changer 10 moves the conveying block 20 by the use of the rack 191 in a direction (Z-direction) such that the recording medium delivery block 50 is at a height of the desired slot. Further, the recording medium changer 10 moves the recording medium delivery block 50 in the depth direction (Y-direction) such that the recording medium delivery block 50 is at a position to be opposed to the desired slot.

Further, the conveying block 20 is connected to the control block 17 and the power-supply block 18 of the basic unit 11 via a cable 81. Communication and power supply are performed via the cable 81.

Note that the recording medium changer 10 is not limited to be configured using the basic unit 11, the slot extension unit 12, and the drive extension unit 13 as described above. For example, the recording medium changer 10 may be configured using a casing with a predetermined size and an area corresponding to the basic unit and an area(s) corresponding to the slot extension unit and/or the drive extension unit may be provided in the casing.

<2. Configuration of Conveying Block>

Figure 8:
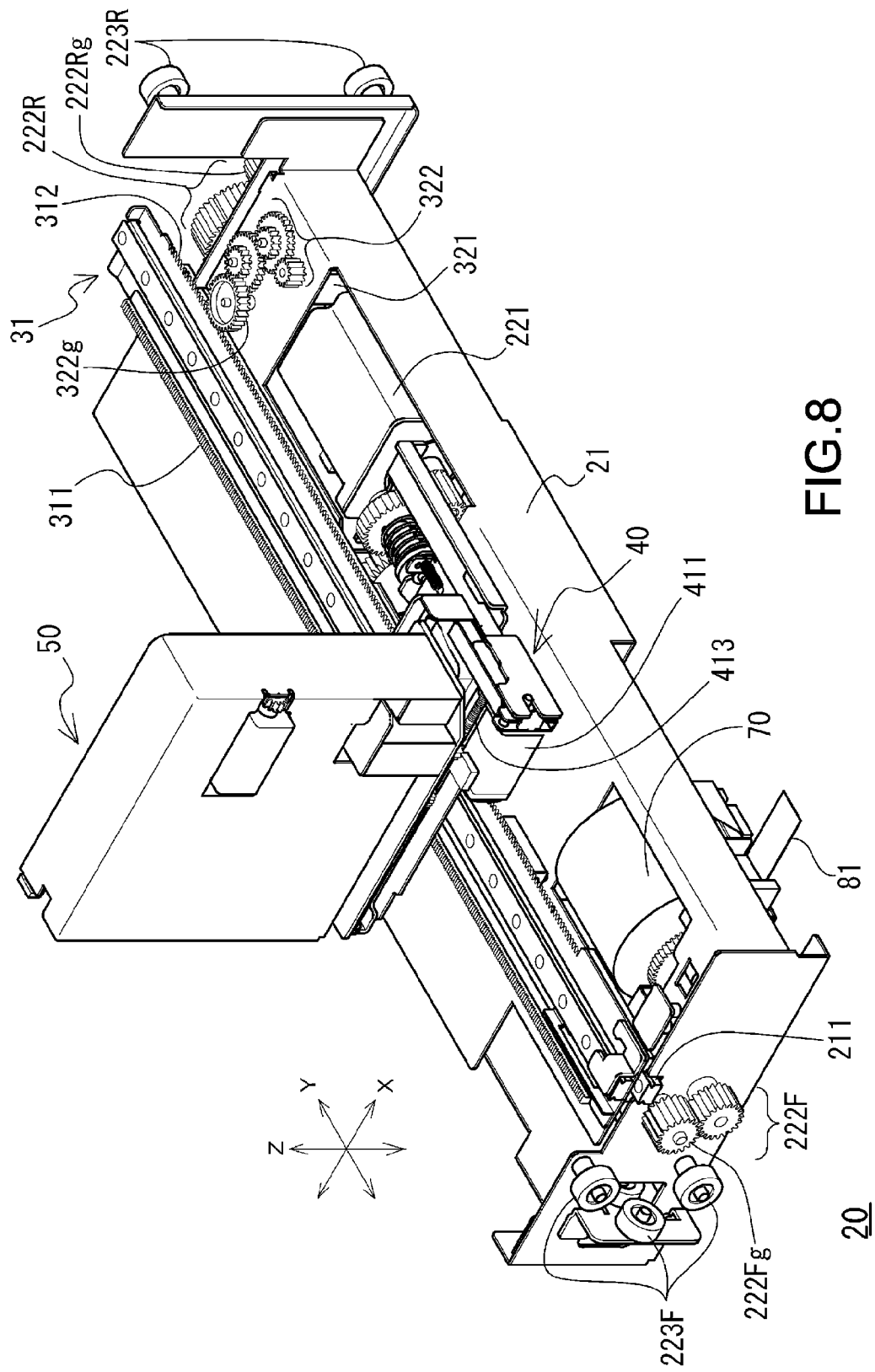
FIG. 8 is a perspective view illustrating a configuration of the conveying block (when viewed from a front side)
Figure 9:
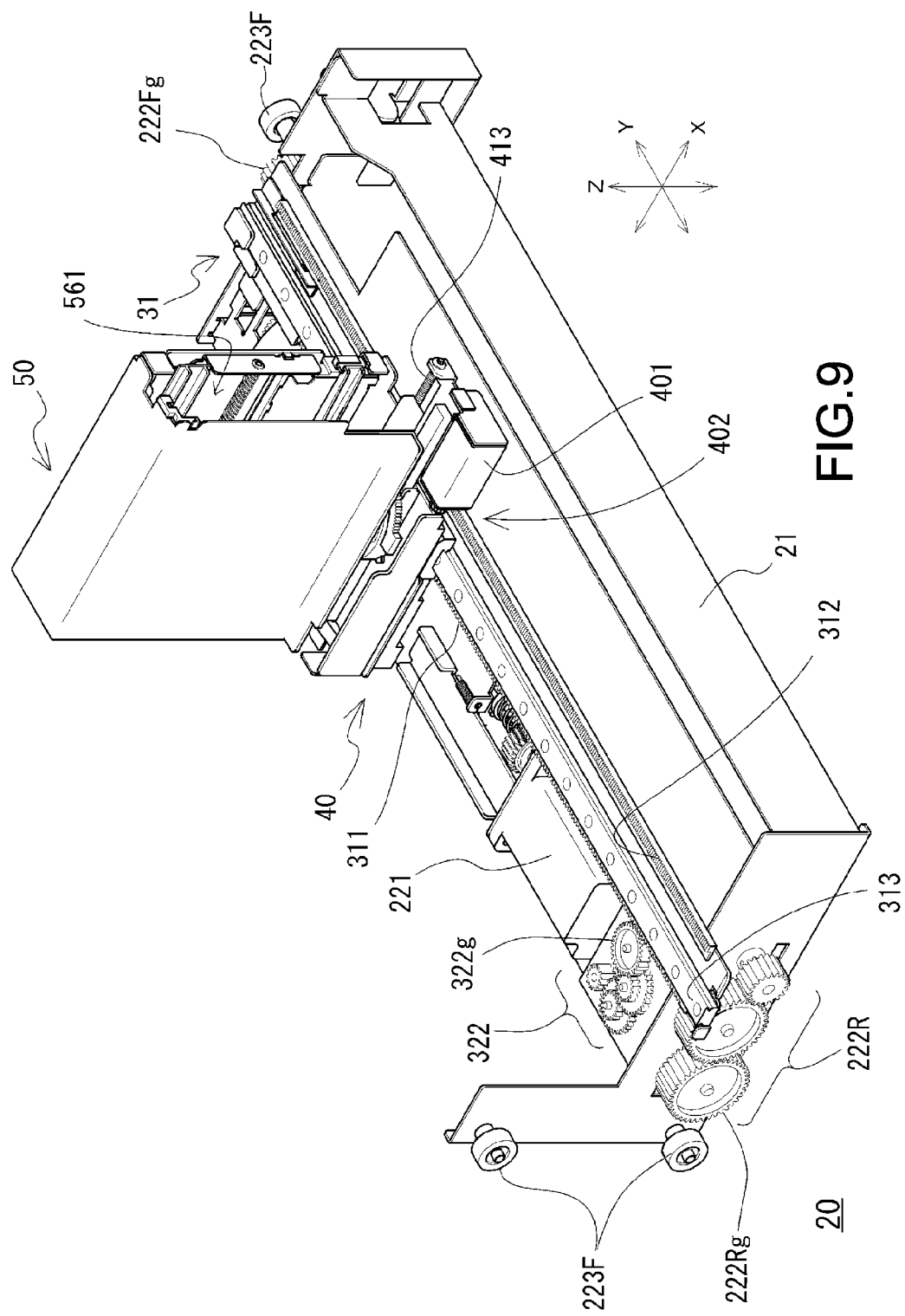
FIG. 9 is a perspective view illustrating the configuration of the conveying block (when viewed from a back side)
Figure 10A:
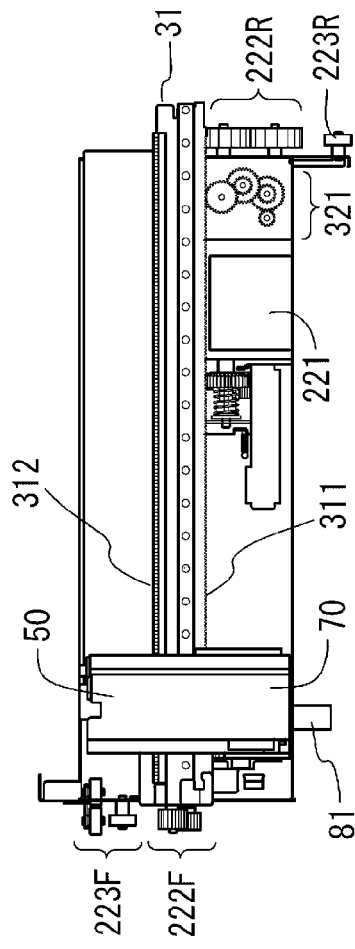
FIGS. 10A-C are views illustrating the configuration of the conveying block (when a rail portion is in a contraction state)
Figure 10B:
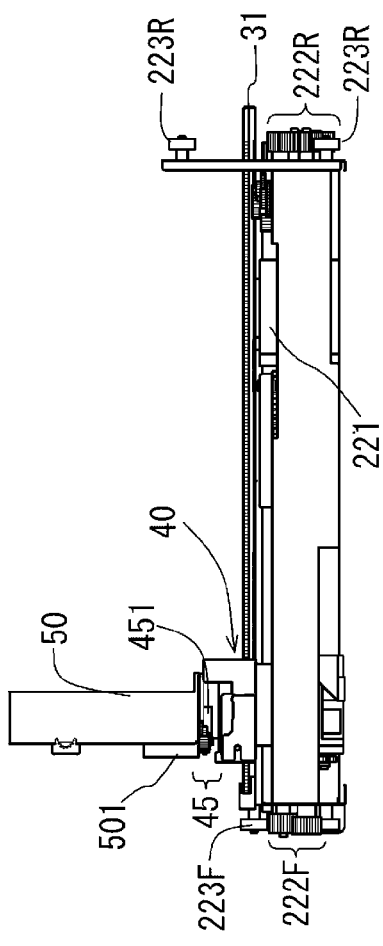
Figure 10C:
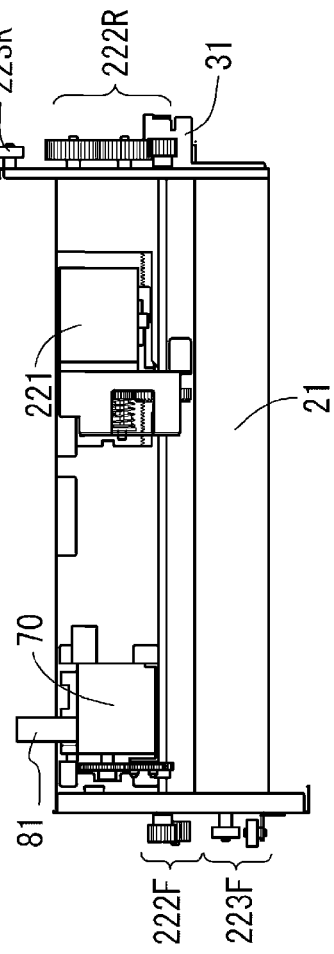
Figure 12:
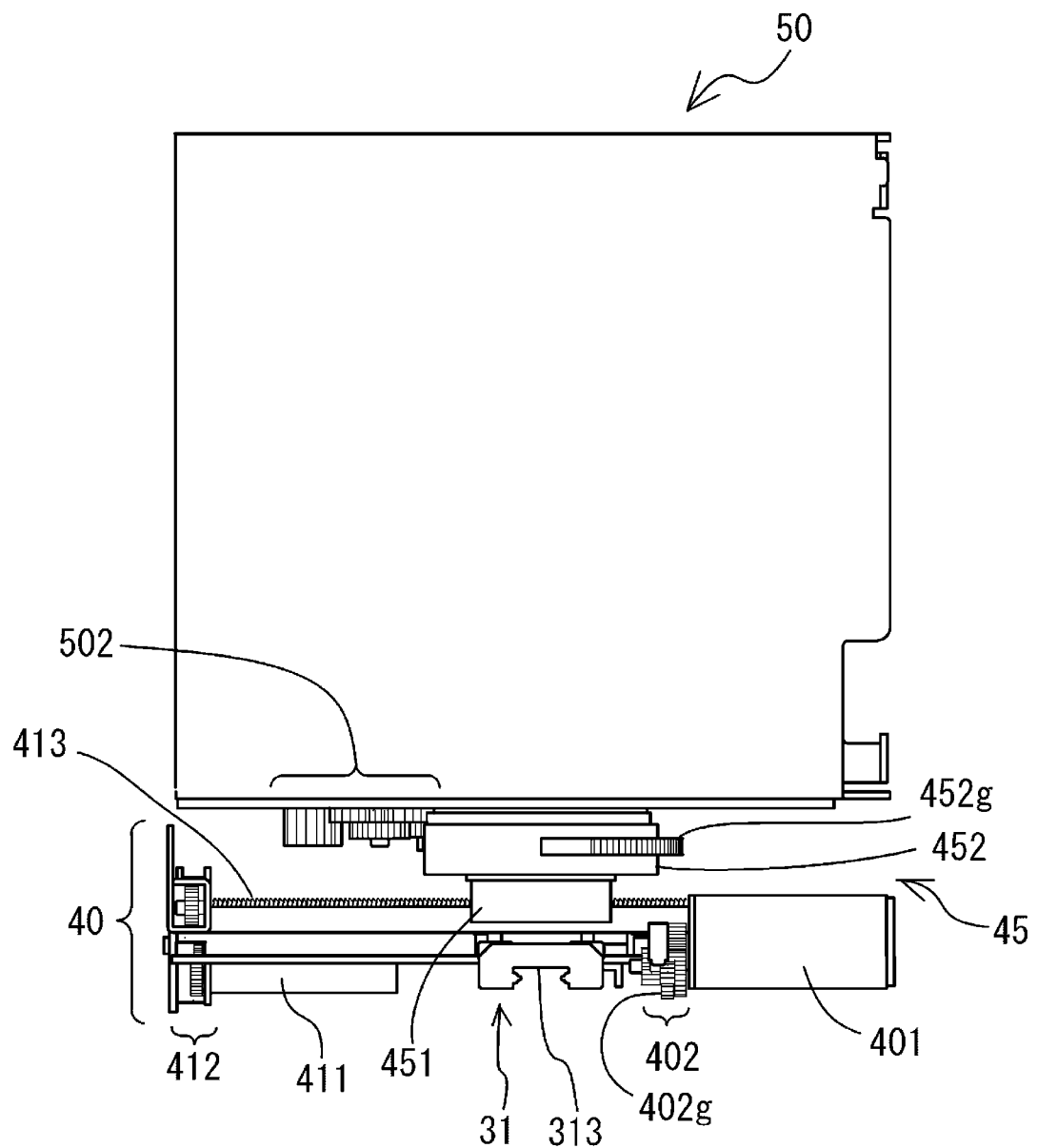
FIG. 12 is a view of a support portion of a recording medium delivery block when viewed from a back side of the recording medium changer.

Next, a configuration of the conveying block 20 will be described. FIGS. 8 and 9 are perspective views each illustrating the configuration of the conveying block 20. Note that FIG. 8 is a perspective view when the conveying block 20 is viewed from the front side of the recording medium changer 10 and FIG. 9 is a perspective view when the conveying block 20 is viewed from the back side of the recording medium changer 10. FIGS. 10A-C and 11 are views each illustrating the configuration of the conveying block. FIGS. 10A-C show a case where the rail portion is in a contraction state. FIGS. 11A-C show a case where the rail portion is in an extension state. Note that FIGS. 10A and 11A show plan views, FIGS. 10B and 11B show right side view, and FIGS. 10C and 11C show lower view. FIG. 12 is a view of a support portion of the recording medium delivery block 50 when viewed from the back side of the recording medium changer 10.

A conveying-block chassis 21 of the conveying block 20 is provided with a conveying-block movement mechanism, a rail portion, and a rail movement mechanism.

The conveying-block movement mechanism includes a conveying-block moving motor 221, drive transmission portions 222F and 222R, guide rollers 223F and 223R, and the like.

The conveying-block moving motor 221 generates a driving force for moving the conveying block 20 in the upper and lower directions (Z-direction). The drive transmission portion 222F includes, for example, a plurality of gears. A driven gear (pinion) 222Fg is provided to mesh with a rack 191F of a guide portion 19F provided to the basic unit 11, the slot extension unit 12, and the drive extension unit 13. The drive transmission portion 222R includes, for example, a plurality of gears. A driven gear (pinion) 222Rg is provided to mesh with a rack 191R of a guide portion 19R provided to the basic unit 11, the slot extension unit 12, and the drive extension unit 13. Therefore, the conveying block 20 moves in the upper and lower directions by the driven gears (pinions) 222Fg and 222Rg of the drive transmission portions 222F and 222R being rotated by the conveying-block moving motor 221.

A pair of the guide rollers 223F sandwiches a guide plate 192F of the guide portion 19F. Further, the other guide rollers 223F move in guide grooves of the guide plate 192F. The guide rollers 223R move in guide grooves of a guide plate 192R of the guide portion 19R. Therefore, the conveying block 20 is positioned at a correct position by the guide rollers 223F and 223R when the conveying block 20 is moved in the upper and lower directions.

In a side surface of the rail portion 31, a rack 311 for driving the rail portion 31 in a rail longitudinal direction (Y-direction) is formed. In a surface of the rail portion 31 on a side of the recording medium delivery block, a rack 312 and a guide 313 for moving a recording medium delivery block base 40 to be described later in the rail longitudinal direction (Y-direction) are formed. On an opposite surface side of the rail portion 31, a guide receiving portion (not shown) is formed. The guide receiving portion is fitted onto a slide guide 211 provided to the conveying-block chassis 21 to extend in the rail longitudinal direction (Y-direction) so as to hold slide guide 211, and holds the rail portion 31 to be able to be extended and contracted in the rail longitudinal direction (Y-direction). The rack 311 mesh with a driven gear (pinion) 322g of a drive transmission portion 322 forming part of the rail movement mechanism. Further, the rack 312 meshes with a driven gear (pinion) 402g of a drive transmission portion 402 forming part of a recording medium delivery block base movement mechanism to be described later.

The rail movement mechanism includes a rail moving motor 321 attached to the conveying-block chassis 21, the drive transmission portion 322, the rack 311 of the rail portion 31, and the like.

The rail moving motor 321 generates a driving force for moving the rail portion 31 in the rail longitudinal direction (Y-direction). The drive transmission portion 322 includes, for example, a plurality of gears. A driven gear (pinion) 322g meshes with the rack 311 of the rail portion 31. Therefore, the rail portion 31 moves in the rail longitudinal direction (Y-direction) by the driven gear (pinion) 322g of the drive transmission portion 322 being rotated by the rail moving motor 321. At this time, the guide receiving portion of the rail portion 31 slides in a state of being fitted onto the slide guide 211.

The rail portion 31 is provided with the recording medium delivery block base 40 that moves on the rail in the rail longitudinal direction (Y-direction). The recording medium delivery block base 40 is provided with a recording medium delivery block holding portion 45 that holds the recording medium delivery block 50 to be rotatable with the upper and lower directions (Z-direction) being an axis. Further, the recording medium delivery block holding portion 45 is provided to be movable in a direction (X-direction) orthogonal to the rail longitudinal direction (Y-direction) with respect to the recording medium delivery block base 40.

Further, the conveying block 20 includes the recording medium delivery block base movement mechanism, a recording medium delivery block holding portion movement mechanism, and a recording medium delivery block rotation mechanism.

The recording medium delivery block base movement mechanism moves the recording medium delivery block base 40 in the rail longitudinal direction (Y-direction). The recording medium delivery block base movement mechanism includes a recording medium delivery block base movement motor 401 and the drive transmission portion 402, which are attached to the recording medium delivery block base 40, the rack 311 of the rail portion 31, and the like.

The recording medium delivery block base movement motor 401 generates a driving force for moving the recording medium delivery block base 40 in the rail longitudinal direction (Y-direction). As shown in FIG. 12, the drive transmission portion 402 includes, for example, a plurality of gears. A driven gear (pinion) 402g meshes with the rack 312 of the rail portion 31 shown in FIG. 8 or the like. Further, the recording medium delivery block base 40 is provided with a guide receiving portion 405 shown in FIG. 12. The guide receiving portion 405 is fitted onto the guide 313 of the rail portion 31 to hold the guide 313 of the rail portion 31. Therefore, the recording medium delivery block base 40 moves on the rail portion in the rail longitudinal direction (Y-direction) by the driven gear (pinion) 402g of the drive transmission portion 402 being rotated by the recording medium delivery block base movement motor 401. At this time, the guide receiving portion 405 of the recording medium delivery block base 40 slides in a state of being fitted onto the guide 313.

The recording medium delivery block holding portion movement mechanism moves the recording medium delivery block holding portion 45 in a direction (X-direction) orthogonal to the rail longitudinal direction (Y-direction) with respect to the recording medium delivery block base 40. The recording medium delivery block holding portion movement mechanism includes a holding portion moving motor 411, a drive transmission portion 412, and a feed screw 413, which are attached to the recording medium delivery block base 40, a nut provided to the recording medium delivery block holding portion 45, and the like.

The holding portion moving motor 411 shown in FIG. 12 generates a driving force for moving the recording medium delivery block holding portion 45 in a direction orthogonal to the rail longitudinal direction with respect to the recording medium delivery block base 40. The drive transmission portion 412 includes, for example, a plurality of gears. A driven gear is provided with the feed screw 413 with rotational axe thereof corresponding to each other. Therefore, the nut 451 of the recording medium delivery block holding portion 45 moves in an axis direction of the feed screw 413 by the driven gear of the drive transmission portion 412 being rotated by the holding portion moving motor 411.

The nut 451 of the recording medium delivery block holding portion 45 is provided with a cylindrical bearing portion 452. Further, a tooth portion 452g is formed in an outer peripheral surface of the bearing portion 452.

A rotational shaft 501 of the recording medium delivery block 50 is inserted into the bearing portion 452 of the recording medium delivery block holding portion 45 and rotatably supported by the recording medium delivery block holding portion 45.

The recording medium delivery block 50 includes the recording medium delivery block rotation mechanism for rotating the recording medium delivery block 50 with the rotational shaft 501 being a center. The recording medium delivery block rotation mechanism includes a recording medium delivery block rotational drive motor (not shown) and a drive transmission portion 502, which are attached to the recording medium delivery block 50, the bearing portion 452 of the recording medium delivery block holding portion 45, and the like.

The recording medium delivery block rotational drive motor generates a driving force for rotating the recording medium delivery block 50. The drive transmission portion 502 includes, for example, a plurality of gears. A driven gear meshes with the tooth portion 452g of the bearing portion 452. Therefore, the recording medium delivery block 50 rotates with the rotational shaft 501 being a center by the driven gear of the drive transmission portion 502 being rotated by the recording medium delivery block rotational drive motor.

Further, the conveying block 20 includes a cable processing block 70. When the conveying block 20 is moved in the upper and lower directions by the conveying-block movement mechanism, winding in and out the cable 81 are performed by the cable processing block 70.

Note that the rail movement mechanism, the recording medium delivery block base movement mechanism, the recording medium delivery block holding portion movement mechanism, and the recording medium delivery block rotation mechanism in the conveying block 20 are not limited to the above-mentioned configurations. For example, the drive transmission portion is not limited to including the plurality of gears and other configurations may be adopted. Further, the motor may be provided on other component side or the like.

<3. Operation of Conveying Block>

Figure 13:
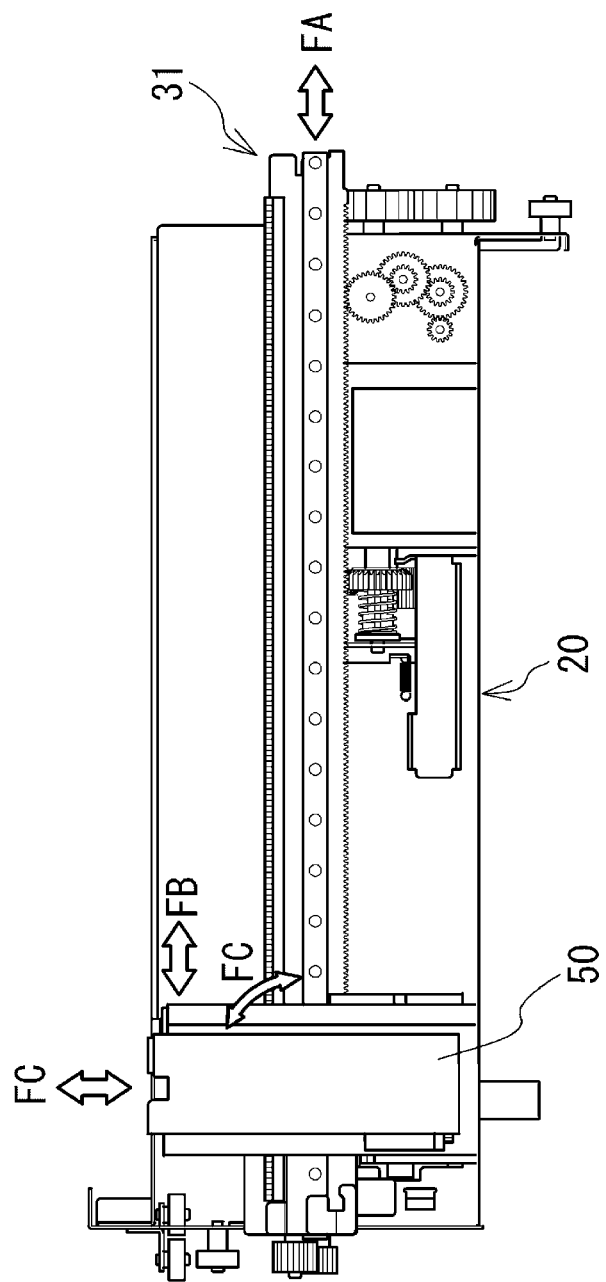
FIG. 13 is a view for explaining an operation of the conveying block.

FIG. 13 is a view for explaining an operation of the conveying block. The conveying block 20 can move the rail portion 31 through the above-mentioned rail movement mechanism in arrow FA-directions. The conveying block 20 can move the recording medium delivery block 50 on the rail portion 31 in arrow FB-directions through the above-mentioned recording medium delivery block base movement mechanism. Further, the conveying block 20 can move the recording medium delivery block 50 in arrow FC-directions through the above-mentioned recording medium delivery block holding portion movement mechanism. In addition, the conveying block 20 can rotate the recording medium delivery block 50 in arrow FD-directions through the above-mentioned recording medium delivery block rotation mechanism.

Therefore, the conveying block 20 can move the recording medium delivery block 50 to the position of the desired slot through the rail movement mechanism and the recording medium delivery block base movement mechanism. Further, the conveying block 20 can cause a recording medium insertion port of the recording medium delivery block 50 to be oriented in a direction of the desired slot 15 or a direction of a recording medium insertion port of the drive block 16 through the recording medium delivery block rotation mechanism. In addition, when the recording medium insertion port 561 of the recording medium delivery block 50 is oriented in a direction of the desired slot 15, the conveying block 20 can move the recording medium delivery block 50 in a recording medium inserting-moving direction of the slot 15 through the recording medium delivery block holding portion movement mechanism. Further, when the recording medium insertion ports of the recording medium delivery block 50 and the drive blocks 16 are oriented to be opposed to each other, the conveying block 20 can move the recording medium delivery block 50 to the position of the recording medium insertion port 161 of the desired drive block 16 through the recording medium delivery block holding portion movement mechanism. Note that, when the recording medium delivery block 50 is positioned at a desired position by the conveying block 20, the recording medium delivery block 50 delivers the recording medium between the slot 15 and the drive block 16.

<4. Cable Processing Block>

By the way, in order to perform the above-mentioned operation in the conveying block, communication between the conveying block 20 and the control block 17 and power supply from the power-supply block 18 to the conveying block are performed via the cable 81.

Therefore, in the case where the conveying block 20 is moved by the conveying block movement mechanism in the upper and lower directions (Z-direction), it is necessary to use the cable having a length depending on a movement amount of the conveying block 20. In the case where the control block 17 and the power-supply block 18 are provided in the basic unit 11 in the lowest stage, for example, a length of the cable 81 is set such that the conveying block 20 can move to a position of the extension unit in the uppermost stage. Therefore, as the conveying block 20 descends, a distance between the conveying block 20 and the control block 17 or the like gradually decreases and the excess length of the cable 81 increases.

In the case where a folding cable is used, there is a fear that the cable is caught in other parts within the casing, for example. Thus, it is necessary to provide a guide mechanism that guides the cable position. Further, in the case where a slip ring is used, the apparatus becomes expensive. In addition, it is necessary to carry out regular inspections and replacement in order to prevent a loose connection at a contact point due to abrasion or the like.

In view of this, the conveying block 20 includes the cable processing block 70 that performs cable processing depending on the movement of the conveying block 20. The cable processing block 70 performs winding of the cable around a first pulley when the conveying block 20 descends and unwinding of the cable wound around the first pulley when the conveying block ascends, to thereby absorb the excess length of the cable. In addition, the other end of the cable is wound around a second pulley in advance, and the second pulley performs tightening or rewinding of the cable depending on the rotation of the first pulley due to the winding or unwinding of the cable. By performing tightening or rewinding of the cable in this manner, the length of the cable from the second pulley to a cable connection provided to the conveying block is kept constant even if the first pulley rotates.

<4-1. Configuration of Cable Processing Block>

FIGS. 14A-C illustrate a configuration of the cable processing block. Note that FIG. 14A illustrates a front view of the cable processing block 70, FIG. 14B illustrates a plan view, and FIG. 14C illustrates a right side view.

The cable processing block 70 includes a first pulley 71, a second pulley 72, a rotational shaft 73, a drive transmission unit 74, a cable processing block chassis 75, a cover 76, and a partition plate 77.

The first pulley 71 rotates about the rotational shaft 73 and performs winding or unwinding of the one end portion of the cable 81.

The second pulley 72 rotates about the rotational shaft 73 together with the first pulley 71 and performs tightening or rewinding the other end portion of the cable 81.

The rotational shaft 73 is rotatably attached to the cable processing block chassis 75 with an axis direction being a direction orthogonal to the upper and lower directions (Z-direction). For example, in FIGS. 8, 11, and 12, the axis direction is the rail longitudinal direction (Y-direction). The rotational shaft 73 is provided with the first pulley 71 and the second pulley 72. Due to the rotation of the rotational shaft 73, the first pulley 71 and the second pulley 72 rotate. The rotational shaft 73 is further provided with the drive transmission unit 74. The rotational shaft 73 rotates due to the rotation of a gear 74g in the drive transmission unit 74.

The drive transmission unit 74 rotates the gear 74g due to a driving force generated by the conveying block moving motor 221. Therefore, when the conveying block moving motor 221 rotates to move the conveying block 20 in the upper and lower directions (Z-direction), the first pulley 71 and the second pulley 72 are rotated depending on the movement of the conveying block 20 in the upper and lower directions (Z-direction).

The cable processing block chassis 75 is provided with the cover 76 to cover the first pulley 71 and the second pulley 72. Further, the partition plate 77 is provided between the first pulley 71 and the second pulley 72. The partition plate 77 prevents an interference between the cable to be wound around the first pulley 71 and the cable to be wound around the second pulley 72.

<4-2. Attachment of Cable>

Figure 15B:
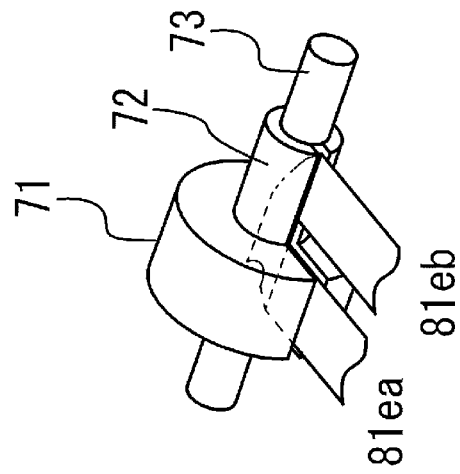
FIGS. 15A-B are views for explaining attachment of a cable to the cable processing block.
Figure 15A:
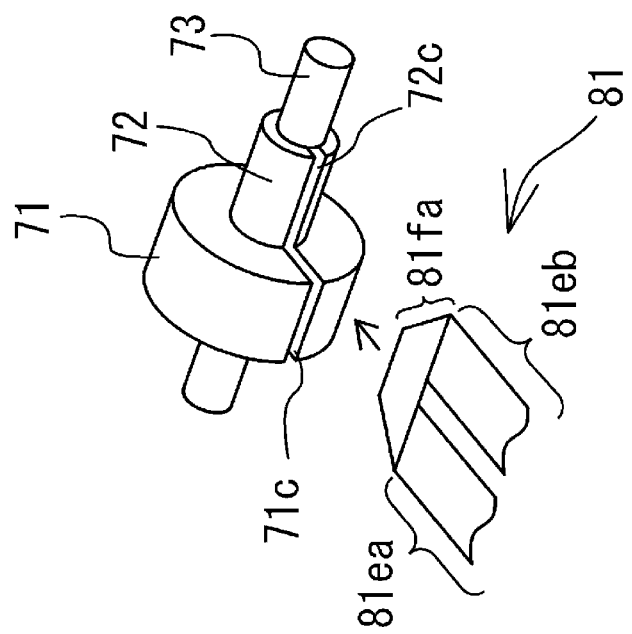

FIGS. 15A-B are views for explaining attachment of the cable to the cable processing block. Note that FIG. 15A shows a state before fixation of the cable and FIG. 15B shows a state after the fixation of the cable.

In the cable processing block 70, a middle part of the cable 81 is fixed to the first pulley 71 and the second pulley 72. On the side of the one end portion of the cable 81, winding or unwinding of the cable 81 is performed by the first pulley 71. On the side of the other end portion of the cable 81, tightening or rewinding of the cable 81 is performed by the second pulley 72.

The one end of the cable 81 is connected to the control block 17 or the power-supply block 18. The other end of the cable 81 is connected to a circuit board or the like within the conveying block. Note that a region on the side of the one end of the cable 81 to be connected to the control block 17 or the power-supply block 18 will be referred to as a fixation block side region 81ea, and a region on the side of the other end of the cable 81 to be connected to the circuit board or the like within the conveying block 20 will be referred to as a conveying block side region 81eb.

In the middle part of the cable 81, there is provided a fixation region 81fa to be fixed to the first pulley 71 and the second pulley 72. For example, in the case where the cable 81 is a flat cable, the fixation region 81fa is set to be a region formed by bending the cable with a longitudinal direction of the cable being a direction orthogonal to the rotational shaft 73 to extend in a rotational shaft direction.

In the first pulley 71 and the second pulley 72, continuous slits 71c and 72c are formed as a cable insertion portion. By inserting the fixation region 81fa into the slits 71c and 72c, the cable 81 is fixed to the first pulley 71 and the second pulley 72. Further, a length of the fixation region 81fa is set such that winding or unwinding of the cable of the fixation block side region 81ea is performed by the first pulley 71 and tightening or rewinding of the cable of the conveying block side region 81eb is performed by the second pulley 72.

A diameter of the first pulley 71 is set such that winding or unwinding of a desired cable length, that is, the fixation block side region 81ea is performed in a rotation range in which rewinding or tightening is performed by the second pulley 72. A length of the fixation block side region 81ea of the cable 81 is set to be a length such that the recording medium delivery block 50 of the conveying block 20 can move to a position corresponding to the slot in the uppermost stage. Further, a length of the conveying block side region 81eb of the cable 81 is set to be a length such that the recording medium delivery block 50 of the conveying block 20 can perform tightening or rewinding of the cable due to the rotation of the rotational shaft 73 when the conveying block 20 moves between the position corresponding to the slot in the lowest stage and the position corresponding to the slot in the uppermost slot.

Further, by setting the diameter to be larger than that of the second pulley, the r.p.m. of the rotational shaft 73 when winding or unwinding of the fixation block side region 81ea is performed can be reduced. Therefore, even if the length of the conveying block side region 81eb is reduced, tightening or rewinding of the cable can be performed depending on winding or unwinding of the fixation block side region 81ea.

<4-3. Operation of Cable Processing Block>

Figure 16A:
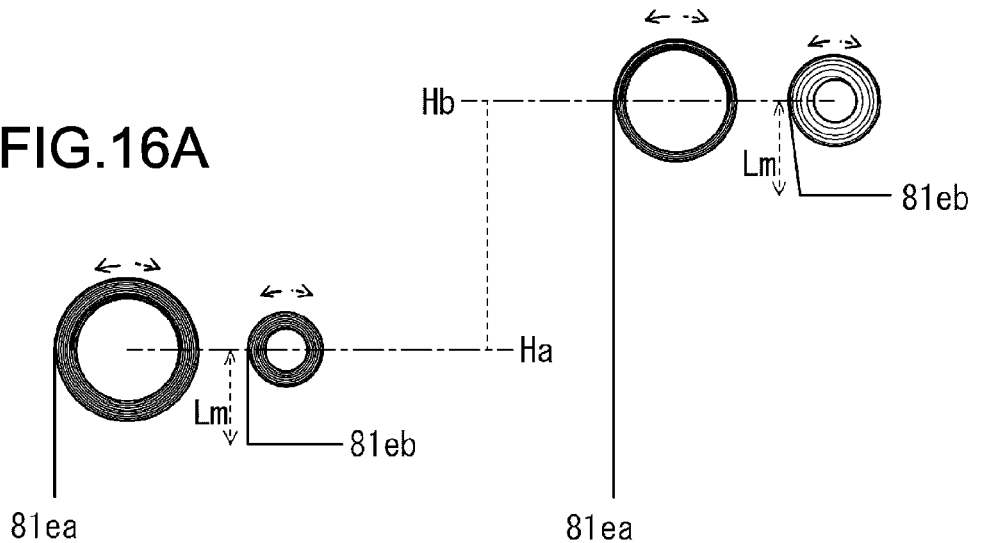
FIGS. 16A-B are views illustrating a position of the conveying block and a processing state in the cable processing block.
Figure 16B:
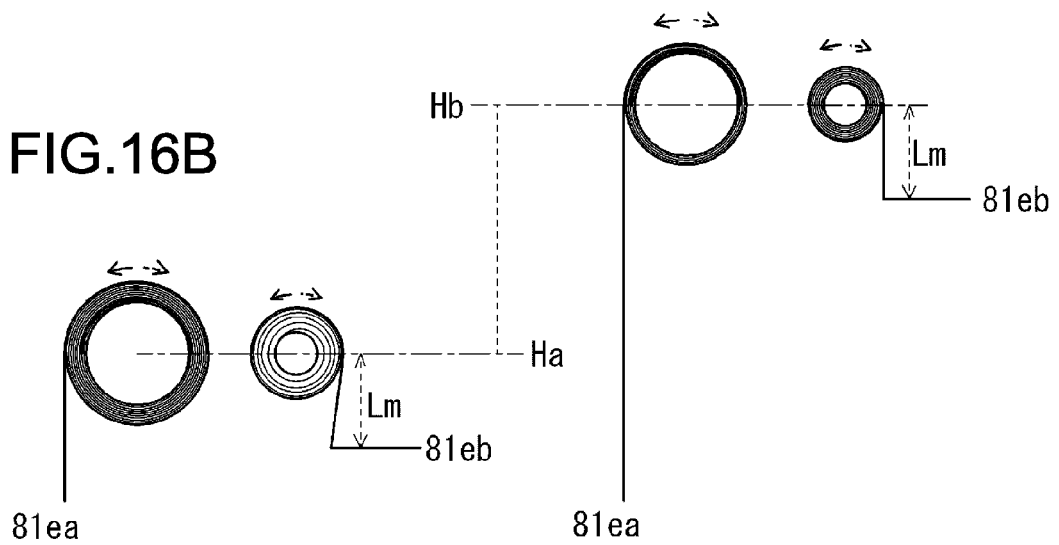

FIGS. 16A-B illustrate a position of the conveying block and a processing state in the cable processing block. Note that FIG. 16A shows a case where a winding direction of the cable 81 is the same in the first pulley 71 and the second pulley 72.

When the first pulley 71 and the second pulley 72 of the conveying block 20 move from a position Ha to a position Hb in the upper direction, the first pulley 71 and the second pulley 72 rotate in a solid-line arrow direction. Therefore, the fixation block side region 81ea is unwound from the first pulley 71 as the conveying block 20 moves in the upper direction. Further, by the second pulley 72 rotating in the solid-line arrow direction, rewinding of the conveying block side region 81eb is performed by the second pulley 72. In this manner, a cable length Lm from the position of the second pulley 72 to a position at which the cable extends in a direction of the circuit board within the conveying block 20 is kept constant.

Further, when the first pulley 71 and the second pulley 72 of the conveying block 20 move from the position Hb to the position Ha in the lower direction, the first pulley 71 and the second pulley 72 rotate in a dashed-line arrow direction. Therefore, the fixation block side region 81ea is wound by the first pulley 71 as the conveying block 20 moves in the lower direction. Further, by the second pulley 72 rotating in the dashed-line arrow direction, tightening of the conveying block side region 81eb is performed by the second pulley 72. In this manner, the cable length Lm from the position of the second pulley 72 to the position at which the cable extends in the direction of the circuit board within the conveying block 20 is kept constant.

FIG. 16B illustrates a case where the winding direction of the cable 81 by the second pulley 72 is opposite to the winding direction of the cable 81 by the first pulley 71.

When the first pulley 71 and the second pulley 72 of the conveying block 20 moves from the position Ha to the position Hb in the upper direction, the first pulley 71 and the second pulley 72 rotate in the solid-line arrow direction. Therefore, the fixation block side region 81ea is unwound from the first pulley 71 as the conveying block 20 moves in the upper direction. Further, the winding direction of the cable 81 by the second pulley 72 is opposite to the winding direction of the cable 81 by the first pulley 71. When the second pulley 72 rotates in the solid-line arrow direction, tightening of the conveying block side region 81eb is performed. Therefore, the cable length Lm from the position of the second pulley 72 to the position at which the cable extends in the direction of the circuit board within the conveying block 20 is kept constant.

Further, when the first pulley 71 and the second pulley 72 of the conveying block 20 move from the position Hb to the position Ha in the lower direction, the first pulley 71 and the second pulley 72 rotate in the dashed-line arrow direction. Therefore, the fixation block side region 81ea is wound by the first pulley 71 as the conveying block 20 moves in the lower direction. Further, the winding direction of the cable 81 by the second pulley 72 is opposite to the winding direction of the cable 81 by the first pulley 71. By the second pulley 72 rotating in the dashed-line arrow direction, rewinding of the conveying block side region 81eb is performed. Therefore, the cable length Lm from the position of the second pulley 72 to the position at which the cable extends in the direction of the circuit board within the conveying block 20 is kept constant.

In this manner, due to the rotation about the rotational shaft 73, winding of the fixation block side region 81ea or unwinding of the wound cable is performed by the first pulley 71. Further, a predetermined-length portion of the conveying block side region 81eb is wound around the second pulley 72. Rewinding or tightening of the wound predetermined-length portion of the cable is performed by the second pulley 72 rotating together with the first pulley 71. Therefore, even when winding or unwinding of the cable is performed by the first pulley 71 along with the movement of the conveying block 20 in the longitudinal direction of the cable, the length of the cable pulled out from the second pulley 72 can be kept constant. Therefore, it is unnecessary to provide the guide mechanism that guides the cable position unlike the case where the folding cable is used. Further, electrical connection can be established without the slip ring. Therefore, for example, highly reliable cable processing can be easily performed at low costs with a simple configuration.

<4-4. Case Where Fluctuation Absorbing Mechanism is Provided>

By the way, when winding of the cable 81 (fixation block side region 81*ea*) or unwinding of the wound cable is performed by the first pulley 71, a diameter of a cable-winding portion fluctuates depending on the rotation of the first pulley 71. Therefore, when the conveying block 20 moves by a predetermined distance in the upper and lower directions (Z-direction), if the r.p.m. of the rotational shaft 73 is constant, a winding amount or an unwinding amount of the cable from the first pulley 71 fluctuates depending on the position of the conveying block 20 in the upper and lower directions (Z-direction). Specifically, if a large amount of the cable 81 is wound around the first pulley 71, the diameter of the cable is large upon winding or unwinding, and hence the winding amount or the unwinding amount of the cable is large with respect to the rotation of the first pulley 71. Further, if a small amount of the cable 81 is wound around the first pulley 71, the diameter of the cable is small upon winding or unwinding, and hence the winding amount or the unwinding amount of the cable is small with respect to the rotation of the first pulley 71. Therefore, in order to absorb the fluctuation of the winding amount or the unwinding amount, the fluctuation absorbing mechanism is provided.

FIGS. 17A-B illustrate a configuration of a case where the fluctuation absorbing mechanism is provided. The fluctuation absorbing mechanism is, for example, provided to the basic unit 11 and includes a support table 851, an arm 852, a tension pulley 853, and a bend pulley 854. Note that FIG. 17A illustrates a case where the conveying block 20 is located at the bottom. FIG. 17B illustrates a case where the conveying block 20 has been moved in the upper direction.

The support table 851 is, for example, fixed to the basic unit 11. One end of the arm 852 is rotatably held by the support table 851.

The one arm of the arm 852 is rotatably held by the support table 851. The tension pulley 853 is rotatably attached to the other arm of the arm 852. A biasing member (not shown) is attached to the arm 852. The arm 852 is biased by the biasing member in a direction of an arrow TE.

The tension pulley 853 is rotatably held to the other end of the arm 852. The cable 81 is looped over the tension pulley 853.

The bend pulley 854 declines the cable 81 such that the cable 81 is oriented in a certain direction even if the position of the tension pulley 853 changes.

In the thus configured fluctuation absorbing mechanism, the arm 852 is biased in the direction of the arrow TE. Tension force is applied by the tension pulley 853 to the cable 81. Therefore, when the winding amount or the unwinding amount fluctuates, the tension pulley 853 moves with the one end of the arm 852 being a center, and hence deflection of the cable due to the fluctuation of the winding amount or the unwinding amount is absorbed. For example, when the conveying block 20 moves from the position shown in FIG. 17A to the position shown in FIG. 17B, if the amount of unwinding of the cable 81 is larger in comparison with the movement amount of the conveying block 20, the tension pulley 853 moves in the direction of the arrow TE. Therefore, the deflection of the cable can be absorbed.

Note that the fluctuation absorbing mechanism is not limited to be provided to the basic unit 11 and the fluctuation absorbing mechanism may be provided to the conveying block 20. Further, as long as the fluctuation absorbing mechanism is configured to be capable of applying the tension to the cable 81, the fluctuation absorbing mechanism is not limited to have the configuration shown in FIGS. 17A-B.

Due to the provision of the above-mentioned fluctuation absorbing mechanism, the fluctuation of the winding amount or the unwinding amount can be absorbed. Therefore, it is possible to reliably prevent the cable deflected during the movement of the conveying block 20 from being caught in other components or the like, for example. Thus, a highly reliable operation of the recording medium changer can be performed.

Note that the present disclosure should not be construed as being limited to the above-mentioned embodiment of the present disclosure. For example, a drive mechanism that moves the conveying block 20 in the upper and lower directions and the cable processing apparatus may be provided in the basic unit 11 and one end of the fixation block side region 81*ea* of the cable 81 may be connected to the conveying block 20. Further, the cable 81 is not limited to the flat cable and may be another cable.

The embodiment of the present disclosure is merely an example and it is obvious that modifications or substitutions of the embodiment can be made by those skilled in the art without departing from the gist of the present disclosure. Thus, for determining the gist of the present disclosure, the scope of claims should be considered.

Note that the cable processing apparatus of the present disclosure may also take the following configurations.

(1) A cable processing apparatus, including:

a first pulley configured to rotate about a rotational axis;

a second pulley configured to rotate about the rotational axis together with the first pulley; and a cable including a fixation region to be fixed to the first pulley and the second pulley, the first pulley being configured to rotate about the rotational axis, to thereby perform one of winding of the cable from the fixation region to one end portion and unwinding of the wound cable, the cable including a predetermined-length portion from the fixation region to the other end portion, which is wound around the second pulley, the second pulley being configured to rotate about the rotational axis together with the first pulley, to thereby perform one of rewinding and tightening of the wound predetermined-length portion of the cable.

(2) The cable processing apparatus according to (1), in which the first pulley has a diameter set such that one of winding and unwinding of a desired cable length is performed in a rotation range in which one of rewinding and tightening is performed by the second pulley.

(3) The cable processing apparatus according to (2), in which the first pulley has a diameter larger than a diameter of the second pulley.

(4) The cable processing apparatus according to any one of (1) to (3), in which the fixation region is configured to be a region formed by bending the cable with a longitudinal direction of the cable being a direction orthogonal to the rotational axis to extend in a direction of the rotational axis.

(5) The cable processing apparatus according to any one of (1) to (4), in which the first pulley and the second pulley are provided with a cable insertion portion extending in the direction of the rotational axis, and the fixation region is inserted into the cable insertion portion such that the cable is fixed to the first pulley and the second pulley.

(6) The cable processing apparatus according to any one of (1) to (5), in which the cable is wound around the first pulley and the second pulley in the same direction, and the second pulley is configured to perform tightening of the cable depending on rotation of the cable in a winding direction in the first pulley, and to perform rewinding of the cable depending on rotation of the cable in an unwinding direction in the first pulley.

(7) The cable processing apparatus according to any one of (1) to (5), in which the cable is wound around the first pulley and the second pulley in opposite directions, and the second pulley is configured to perform rewinding of the cable depending on rotation of the cable in a winding direction in the first pulley, and to perform tightening depending on rotation of the cable in an unwinding direction in the first pulley.

In the cable processing apparatus and the recording medium changer according to the embodiments of the present disclosure, used are the first pulley that rotates about the rotational axis, the second pulley that rotates about the rotational axis together with the first pulley, and the cable including the fixation region to be fixed to the first pulley and the second pulley. The first pulley rotates along with movement of the conveying mechanism in a longitudinal direction of the cable, to thereby perform one of winding of the cable from the fixation region in a direction of one end portion. The cable includes a predetermined-length portion from the fixation region in a direction of the other end portion, which is wound around the second pulley. The second pulley rotates about the rotational axis together with the first pulley, to thereby perform one of rewinding and tightening of the wound predetermined-length portion of the cable. Therefore, even when winding or unwinding of the cable is performed by the first pulley, the cable length pulled out from the second pulley can be kept constant, for example. For example, the cable processing apparatus and the recording medium changer according to the embodiments of the present disclosure are suitable to an electronic apparatus or an electric apparatus that performs an operation by changing the cable length depending on the movement of the conveying mechanism or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A cable processing apparatus, comprising: a first pulley configured to rotate about a rotational axis;
a second pulley configured to rotate about the rotational axis together with the first pulley; and
a cable including a fixation region to be fixed to the first pulley and the second pulley, wherein the fixation region is configured to be a region formed by bending the cable with a longitudinal direction of the cable being a direction orthogonal to the rotational axis to extend in a direction of the rotational axis, the first pulley being configured to rotate about the rotational axis, to thereby perform one of winding of the cable from the fixation region to one end portion and unwinding of the wound cable, the cable including a predetermined-length portion from the fixation region to the other end portion, which is wound around the second pulley, the second pulley being configured to rotate about the rotational axis together with the first pulley, to thereby perform one of rewinding and tightening of the wound predetermined-length portion of the cable.

2. The cable processing apparatus according to claim 1, wherein the first pulley has a diameter set such that one of winding and unwinding of a desired cable length is performed in a rotation range in which one of rewinding and tightening is performed by the second pulley.

3. The cable processing apparatus according to claim 2, wherein the first pulley has a diameter larger than a diameter of the second pulley.

4. The cable processing apparatus according to claim 1, wherein the first pulley and the second pulley are provided with a cable insertion portion extending in the direction of the rotational axis, and the fixation region is inserted into the cable insertion portion such that the cable is fixed to the first pulley and the second pulley.

5. The cable processing apparatus according to claim 1, wherein the cable is wound around the first pulley and the second pulley in the same direction, and the second pulley is configured to perform tightening of the cable depending on rotation of the cable in a winding direction in the first pulley, and to perform rewinding of the cable depending on rotation of the cable in an unwinding direction in the first pulley.

6. The cable processing apparatus according to claim 1, wherein the cable is wound around the first pulley and the second pulley in opposite directions, and the second pulley is configured to perform rewinding of the cable depending on rotation of the cable in a winding direction in the first pulley, and to perform tightening depending on rotation of the cable in an unwinding direction in the first pulley.

7. A recording medium changer, comprising:
a plurality of slots in which a recording medium is housed;
a drive configured to perform an operation using the recording medium;
a conveying mechanism configured to convey the recording medium between the plurality of slots and the drive;
a cable configured to electrically connect a casing to the conveying mechanism; and
a cable processing mechanism configured to process the cable, the cable processing mechanism including
a first pulley configured to rotate about a rotational axis, and
a second pulley configured to rotate about the rotational axis together with the first pulley, the cable including a fixation region at a predetermined position, the fixation region being fixed to the first pulley and the second pulley, the first pulley being configured to rotate along with movement of the conveying mechanism in a longitudinal direction of the cable, to thereby perform one of winding of the cable from the fixation region to one end portion, that is, a side of one of the conveying mechanism and the casing and unwinding of the wound cable, the cable including a predetermined-length portion from the fixation region to the other end portion, that is, a side of the other of the conveying mechanism and the casing, which is wound around the second pulley, the second pulley being configured to rotate about the rotational axis together with the first pulley, to thereby perform one of rewinding and tightening of the wound predetermined-length portion of the cable.

8. The recording medium changer according to claim 7, wherein the cable processing mechanism further includes a fluctuation absorbing mechanism configured to absorb deflection of the cable that is caused between the conveying mechanism and the casing due to fluctuation of a diameter of a cable winding portion when the first pulley rotates along with the movement of the conveying mechanism in the longitudinal direction of the cable.

* * * * *